(12) United States Patent
Ohno et al.

(10) Patent No.: US 7,729,038 B2
(45) Date of Patent: Jun. 1, 2010

(54) METHOD OF MANUFACTURING INFORMATION DISPLAY PANEL

(75) Inventors: Shingo Ohno, Tokyo (JP); Kanji Tanaka, Tokyo (JP); Ryo Sakurai, Tokyo (JP); Yoshitomo Masuda, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 890 days.

(21) Appl. No.: 11/585,105

(22) Filed: Oct. 24, 2006

(65) Prior Publication Data

US 2007/0202618 A1  Aug. 30, 2007

(30) Foreign Application Priority Data

| Oct. 24, 2005 | (JP) | .............................. | 2005-308617 |
| Nov. 29, 2005 | (JP) | .............................. | 2005-344171 |
| Oct. 18, 2006 | (JP) | .............................. | 2006-284237 |
| Oct. 18, 2006 | (JP) | .............................. | 2006-284253 |

(51) Int. Cl.
*G02B 26/00* (2006.01)
*H01J 9/24* (2006.01)
*G09G 3/34* (2006.01)

(52) U.S. Cl. .................... 359/296; 359/245; 445/24; 445/25; 345/107; 204/600; 313/582

(58) Field of Classification Search ................ 359/296, 359/245; 345/55, 107, 173, 204; 445/24, 445/25; 204/450, 484, 600; 313/582, 583; 349/2, 106, 155; 438/22

See application file for complete search history.

(56) References Cited

U.S. PATENT DOCUMENTS

| 5,754,003 A | * | 5/1998 | Murai et al. ................. | 313/582 |
| 6,524,153 B1 | * | 2/2003 | Ikeda et al. ................... | 445/24 |

(Continued)

FOREIGN PATENT DOCUMENTS

JP   2003-207810 A   7/2003

(Continued)

OTHER PUBLICATIONS

Korean Office Action dated Sep. 3, 2007.

*Primary Examiner*—Loha Ben
(74) *Attorney, Agent, or Firm*—Sughrue Mion, PLLC

(57) ABSTRACT

In the method of manufacturing an information display panel, in which at least one group of display media having optical reflectance and charge characteristics and consisting of at least one or more groups of particles, are sealed in a cell formed by partition walls between two substrates, at least one substrate being transparent, and, in which the display media, to which an electrostatic field is applied, are made to move so as to display information such as an image, a display media filling step for filling the display media in the cell includes the steps of: setting a screen over the partition walls; arranging the display media on the screen; and moving a plate member on the screen under such a condition that the plate member is contacted to the screen. In this manner, it is possible to obtain the method of manufacturing the information display panel in which it is possible to fill the display media by an easy process, and to make easy a control of an area, to which the display media are to be filled, and a control of an amount of the display media to be filled.

6 Claims, 17 Drawing Sheets

U.S. PATENT DOCUMENTS

| | | | |
|---|---|---|---|
| 6,525,865 B2 * | 2/2003 | Katase | 359/296 |
| 6,636,341 B2 * | 10/2003 | Kanbe | 359/296 |
| 6,729,924 B2 * | 5/2004 | Ikeda et al. | 445/24 |
| 6,756,964 B2 * | 6/2004 | Nihira et al. | 345/107 |
| 6,788,452 B2 | 9/2004 | Liang et al. | |
| 6,816,303 B2 * | 11/2004 | Ukigaya | 359/296 |
| 6,956,691 B2 * | 10/2005 | Kaneko et al. | 359/296 |
| 7,112,114 B2 * | 9/2006 | Liang et al. | 445/24 |
| 7,324,264 B2 * | 1/2008 | Aylward et al. | 359/296 |
| 7,495,819 B2 * | 2/2009 | Sakurai et al. | 359/296 |

FOREIGN PATENT DOCUMENTS

| | | |
|---|---|---|
| WO | 03/027764 | 4/2003 |
| WO | 03/075087 | 9/2003 |
| WO | 2004/001498 | 12/2003 |

* cited by examiner (a)

(b)

(a)

(b)

METHOD OF MANUFACTURING INFORMATION DISPLAY PANEL

BACKGROUND OF THE INVENTION

1. Field of the Invention

The present invention relates to a method of manufacturing an information display panel, in which at least one group of display media having optical reflectance and charge characteristics and consisting of at least one or more groups of particles, are sealed in a cell formed by partition walls between two substrates, at least one substrate being transparent, and, in which the display media, to which an electrostatic field is applied, are made to move so as to display information such as an image.

2. Description of Related Art

As an information display device substitutable for liquid crystal display (LCD), information display devices with the use of technology such as an electrophoresis method, an electro-chromic method, a thermal method, dichroic-particles-rotary method are proposed.

As for these information display devices, it is conceivable, as compared with LCD, as inexpensive visual display device of the next generation from a merit having wide field of vision close to normal printed matter, having smaller consumption, or having a memory function, and spreading out to a display for portable device and an electronic paper is expected. Recently, electrophoresis method is proposed that microencapsulate dispersion liquid made up with dispersion particles and coloration solution and dispose the liquid between faced substrates, and also it is expected.

However, in the electrophoresis method, there is a problem that a response rate is slow by the reason of viscosity resistance because the particles migrate among the electrophoresis solution. Further, there is a problem of lacking imaging repetition stability, because particles with high specific gravity of titanium oxide is scattered within solution of low specific gravity, it is easy to subside, difficult to maintain a stability of dispersion state. Even in the case of microencapsulating, cell size is diminished to a microcapsule level in order to make it hard to appear, however, an essential problem was not overcome at all.

Besides the electrophoresis method using behavior in the solution, recently, a method wherein electro-conductive particles and a charge transport layer are installed in a part of the substrate without using solution is proposed. [The Imaging Society of Japan "Japan Hardcopy '99" (Jul. 21-23, 1999) Transaction Pages 249-252] However, the structure becomes complicated because the charge transport layer and further a charge generation layer are to be arranged. In addition, it is difficult to constantly dissipate charges from the electro-conductive particles, and thus there is a drawback on the lack of stability during display rewriting.

As one method for overcoming the various problems mentioned above, an information display panel is known, in which at least one or more groups of display media having optical reflectance and charge characteristic, which are constituted by at least one of more groups of particles, are sealed between opposed two substrates, at least one substrate being transparent, and, in which the display media, to which an electrostatic field is applied, are made to move so as to display information such as an image.

In a method of manufacturing the information display panel mentioned above, as a method of filling the display media in the cell, it is conceivable that the display media are scattered from an upper portion of the cell so as to fill the display media in the cell. FIG. 24 is a schematic view explaining one known method of filling the display media. In FIG. 24, display media 56 are filled in a cell 54 by: setting a substrate 55, on which the cell 54 is formed by means of partition walls 53, at an under portion of a container 52 having a nozzle 51 at its upper portion; arranging a mask 57 on a top portion of the partition walls 53; and scattering the display media 56 from the nozzle 51. In the scattering method mentioned above, since a time necessary for filling is long, there is a drawback, especially when plural groups of the display media are to be filled in the cell, such that it takes a long time due to a repetition of the same filling step to the number of plural groups of the display media to be filled. In order to solve the problem mentioned above, it is conceivable that the display media a re filled in the cell by means of a squeegee-method, in which the display media are arranged on the substrate having the cell and a plate member called a squeegee is moved on the substrate. However, in this squeegee-method, there is a drawback such that a control of an area, to which the display media are to be filled, and a control of an amount of the display media to be filled are difficult.

SUMMARY OF THE INVENTION

An object of the invention is to eliminate the drawbacks mentioned above and to provide a method of manufacturing an information display panel, which can fill the display media by an easy process, and which can make easy a control of an area, to which the display media are to be filled, and a control of an amount of the display media to be filled.

According to the invention, a method of manufacturing an information display panel, in which at least one group of display media having optical reflectance and charge characteristics and consisting of at least one or more groups of particles, are sealed in a cell formed by partition walls between two substrates, at least one substrate being transparent, and, in which the display media, to which an electrostatic field is applied, are made to move so as to display information such as an image, comprises a display media filling step for filling the display media in the cell including the steps of: setting a screen over the partition walls; arranging the display media on the screen; and moving a plate member on the screen under such a condition that the plate member is contacted to the screen.

As a preferred embodiment of the method of manufacturing the information display panel according to the invention, there is a case: such that a position of the cell formed by the partition walls and a position of arranging mesh open portions of the screen or a position of arranging holes of the screen correspond one by one; such that, in the case of filling plural groups of the display media having different optical reflectance and different charge characteristics in the cell, a mixture of plural groups of the display media having different optical reflectance and different charge characteristics is filled in the cell; such that an area, to which the display media are to be filled, is controlled by a mesh shape of the screen; such that an amount of the display media to be filled in the cell is controlled by a size and a kind of the screen and a moving condition of the plate member; and such that, in the case of arranging electrodes to the substrate, a position of arranging the electrodes and a position of arranging mesh open portions of the screen or a position of arranging holes of the screen correspond one by one.

In the method of manufacturing the information display panel according to the invention, since a display media filling step for filling the display media in the cell including the steps of: setting a screen over the partition walls; arranging the display media on the screen; and moving a plate member on the screen under such a condition that the plate member is contacted to the screen, it is possible to fill the display media by an easy process, and to make easy a control of an area, to which the display media are to be filled, and a control of an amount of the display media to be filled.

DESCRIPTION OF THE PREFERRED EMBODIMENT

At first, a basic construction of an information display panel according to the present invention will be explained. In the information display panel used in the present invention, an electrostatic field is applied to display media sealed in the space between two opposed substrates. Along a direction of the applied electrostatic field by means of the force of the electrostatic field, Coulomb's force or the like, the charged display media are attracted and moved by varying a direction of electrostatic field. Accordingly, information such as an image or the like can be displayed. Therefore, it is necessary to design the information display panel in such a manner that the display media can move evenly and maintain stability during a reciprocal operation or during a reserving state. Here, as to forces applied to the particles constituting display media, there are an attraction force between the particles due to Coulomb's force, an imaging force with respect to the electrodes or substrates, an intermolecular force, a liquid bonding force, a gravity and the like.

A basic constitution of the information display panel of the invention will be explained with reference to FIG. 1-FIG. 3.

Figure 1:
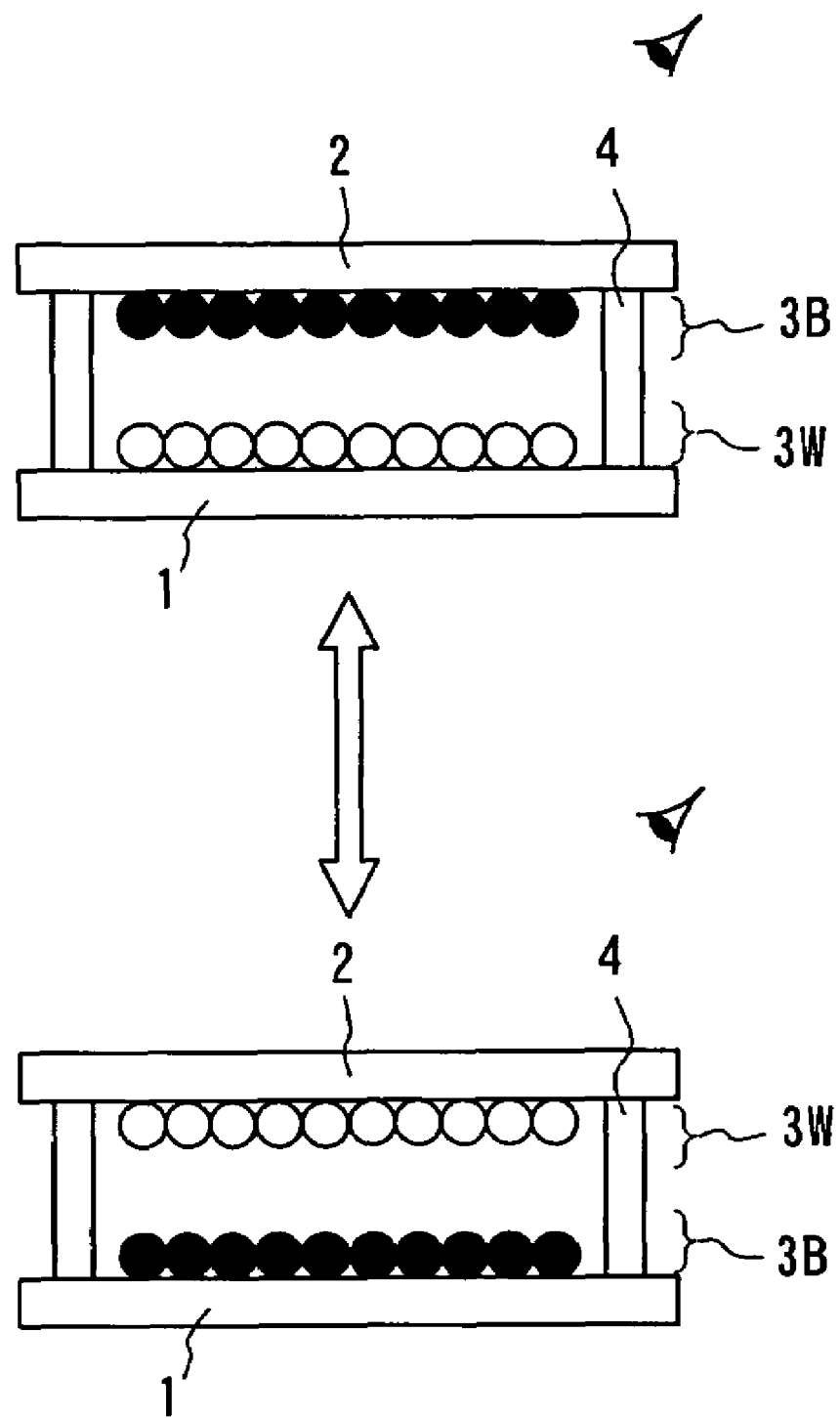
FIG. 1 is a schematic view showing one embodiment of the information display panel, which is a manufacturing object of the invention.

In the example shown in FIG. 1, at least two or more groups of display media 3 having different optical reflectance and charging characteristics and consisting of at least one or more groups of particles (here, a white particle 3W consisting of particles for white display media and a black particle 3B consisting of particles for black display media are shown) are sealed between the substrates 1 and 2 and are moved in each cell formed by partition walls perpendicularly with respect to substrates 1 and 2, in accordance with an electric field applied outside of the substrates 1 and 2, so as to display a black color by viewing the black color display media 3B to an observer or so as to display a white color by viewing the white color display media 3W to the observer. In the example shown in FIG. 1, a cell is formed by arranging for example grid-like partition walls 4 between the substrates 1 and 2 (in the figure, the partition walls arranged at the near side are omitted).

Figure 2:
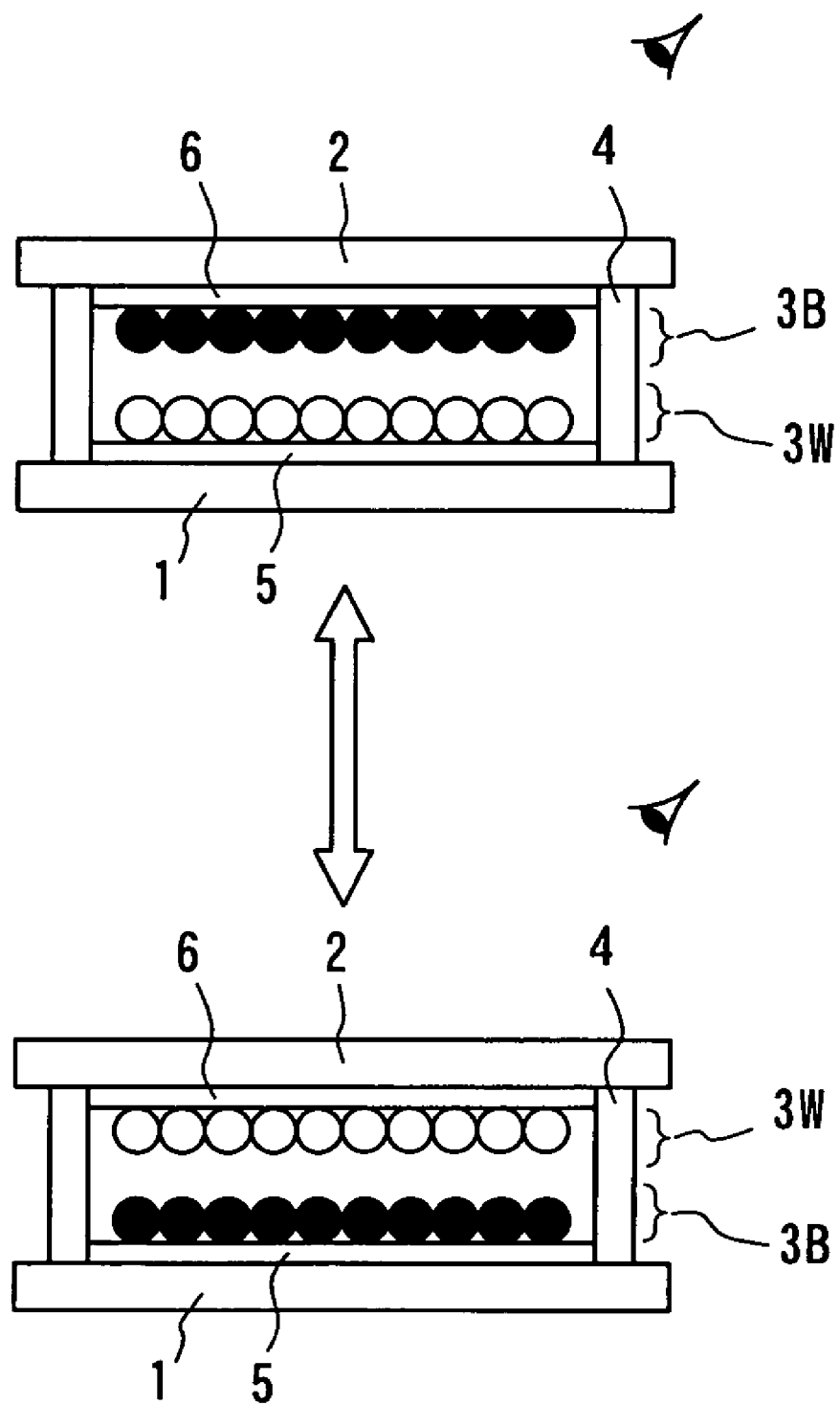
FIG. 2 is a schematic view illustrating another embodiment of the information display panel, which is a manufacturing object of the invention.

In the examples shown in FIG. 2, at least two or more groups of display media 3 having different colors and consisting of at least one or more groups of particles (here, a white color display media 3W made of the particles and a black color display media 3B made of the particles are shown) are moved in a perpendicular direction with respect to substrates 1 and 2, in accordance with an electric field generated by applying a voltage between an electrode 5 arranged to the substrate 1 and an electrode 6 arranged to the substrate 2, so as to display a black color by viewing the black color display media 3B to an observer or so as to display a white color by viewing the white color display media 3W to the observer. In the example shown in FIG. 2, a cell is formed by arranging for example grid-like partition walls 4 between the substrates 1 and 2 (in the figure, the partition walls arranged at the near side are omitted).

Figure 3:
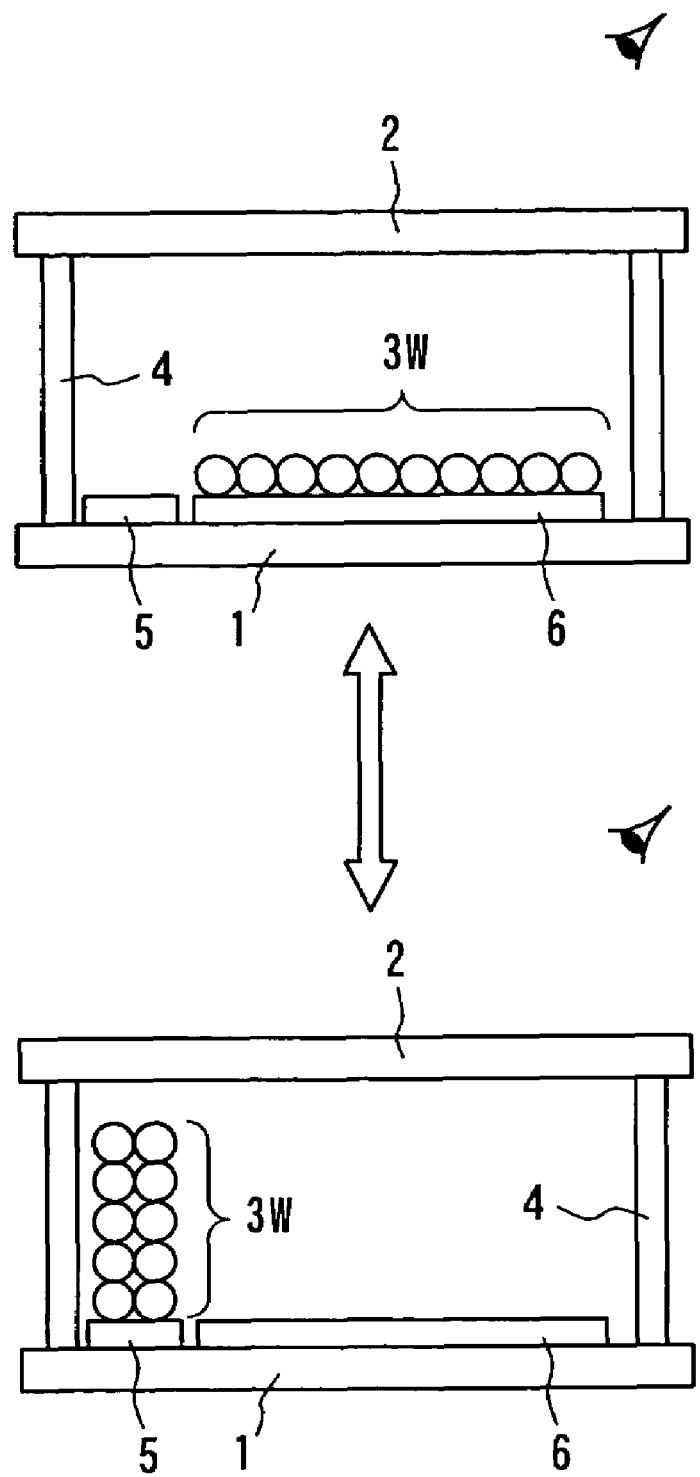
FIG. 3 is a schematic depicting still another embodiment of the information display panel, which is a manufacturing object of the invention.

In the examples shown in FIG. 3, at least one group of display media 3 having a color and consisting of at least one or more groups of particles (here, a white color display media 3W made of the particles) are moved in a parallel direction with respect to substrates 1 and 2, in accordance with an electric field generated by applying a voltage between the electrode 5 arranged to the substrate 1 and the electrode 6 arranged to the substrate 1, so as to display a white color by viewing the white color display media 3W to an observer or so as to display a color of the electrode 6 or the substrate 1 (color generated by an optical reflectance other than that of the white color display media 3W) by viewing a color of the electrode 6 or the substrate 1 to the observer. In the example shown in FIG. 3, a cell is formed by arranging for example grid-like partition walls 4 between the substrates 1 and 2 (in the figure, the partition walls arranged at the near side are omitted).

The above explanations can be applied to a case such that the white color display media 3W are substituted by white color display media made of liquid powders or a case such that the black color display media 3B are substituted by black color display media made of liquid powders.

The feature of the information display panel according to the invention is that a display media filling step for filling the display media in the cell includes the steps of: setting a screen over the partition walls; arranging the display media on the screen; and moving a plate member on the screen under such a condition that the plate member is contacted to the screen. Hereinafter, as to the feature of the invention, a first case such that the screen is made of a mesh cloth in which resin fibers are knitted, and a second case such that the screen is made of a plate having holes will be explained in this order.

As a material of the mesh cloth, in which the resin fibers are knitted, used for example as the screen, use is made of the resin fibers such as polyester fiber, nylon fiber, polyamide fiber, aramid fiber, and further metal fibers. Moreover, as the plate having the holes used for example as the screen, use is made of the metal plate such as SUS plate, steel plate, copper plate, aluminum plate, iron plate, and further a resin plate reinforced by fibers, or a plate in which a surface of the resin plate is coated by metal. Further, as a material of the plate member (sometimes called as a squeegee), use is made of a rubber material such as urethane rubber, natural rubber and other synthetic rubber, and a resin material such as polyester resin, nylon resin, polyamide resin. Furthermore, as the plate member, use is made of the metal plate coated by various rubber materials or various resin materials.

<The Screen Having Mesh Shape in which Resin Fibers are Knitted>

Figure 4:
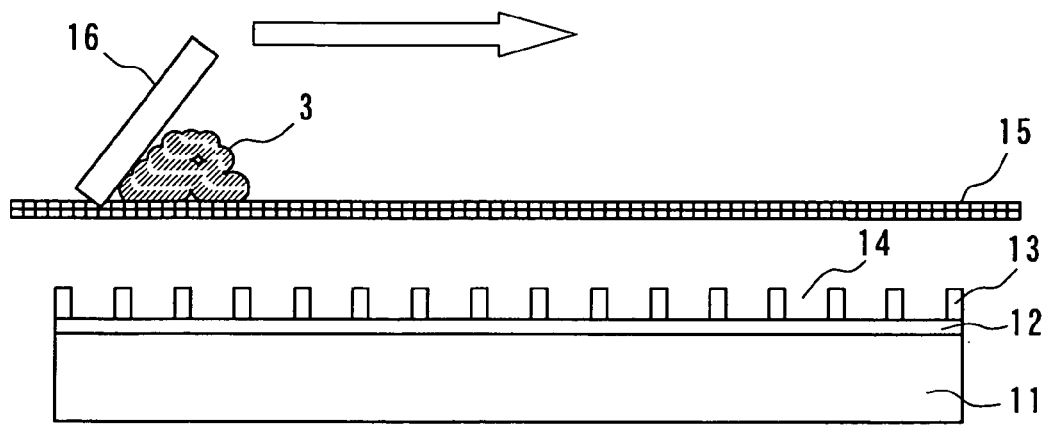
FIG. 4 is a schematic view explaining one embodiment of the method of manufacturing the information display panel according to the invention.

FIG. 4 is a schematic view explaining one embodiment of the method of manufacturing the information display panel according to the invention. In the embodiment shown in FIG. 4: a numeral 11 is a substrate made of glass, polyethelene terephthalate and so on (corresponding to the substrate 1 or 2 in FIGS. 1 to 3); a numeral 12 is an electrode film made of ITO, metal and so on (corresponding to the electrode 5 or 6 in FIGS. 1 to 3); a numeral 13 is a partition wall for forming a cell 14 (corresponding to FIGS. 1 to 3); a numeral 15 is a screen in which the resin fibers are knitted; and a numeral 16 is a plate member (hereinafter, sometimes called as a squeegee). In the embodiment shown in FIG. 4, according to the invention, in the case of filling the display media 3 in the cell 14, the display media 3 are filled in the cell 14 through the screen 15 by setting the screen 15 over the partition walls 13; arranging the display media 3 on the screen 15; and moving the squeegee 16 on the screen 15 from one side to the other side under such a condition that the squeegee 16 is contacted to the screen 15.

In the embodiment, since the display media 3 are filled in the cell 14 through the screen 15 by means of the squeegee 16, it is possible to easily fill the display media 3 in the cell 14 by means of a simple process. Especially, when the image display panel using the plural groups of the display media 3 as shown in FIGS. 1 and 2 is manufactured, it is possible to preferably fill the white color display media 3W and the black color display media 3B orderly. In addition, it is possible to fill the white color display media 3W and the black color display media 3B by one process, if use is made of a mixture thereof as the display media 3. In this case, the effect mentioned above is increased.

Moreover, since the display media 3 are filled in the cell 14 by using the screen 15, it is possible to fill the display media 3 in the cell 14 only, if a portion of the screen 15 corresponding to a portion, to which the display media 3 are not filled, for example, a top portion of the partition wall 13 and a portion outside of the substrate 1, is sealed. In this case, it is possible to control an area in which the display media 3 are to be filled. In addition, if a kind and a size of the screen 15 are varied, or, if a moving condition of the squeegee 16 (for example, conditions such as a contact pressured during moving, a moving speed and so on) is varied, it is possible to control a filling rate and a filling amount of the display media in the cell 14.

<The Screen Having Plate Shape with Holes>

Figure 5:
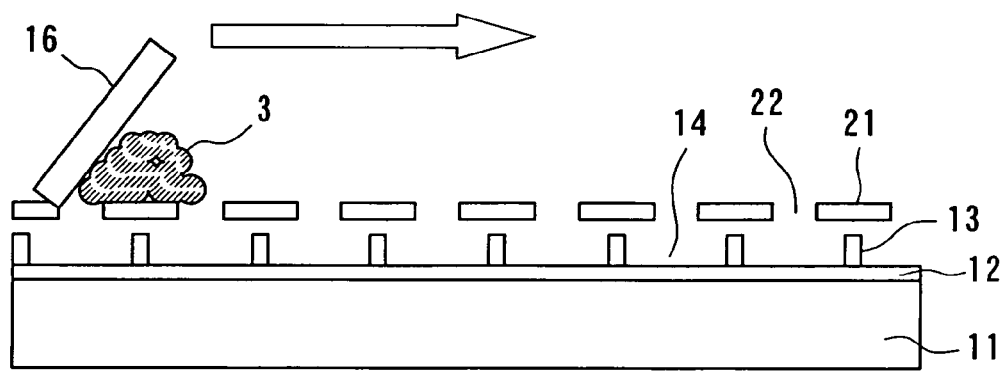
FIG. 5 is a schematic view explaining another embodiment of the method of manufacturing the information display panel according to the invention.
Figure 6:
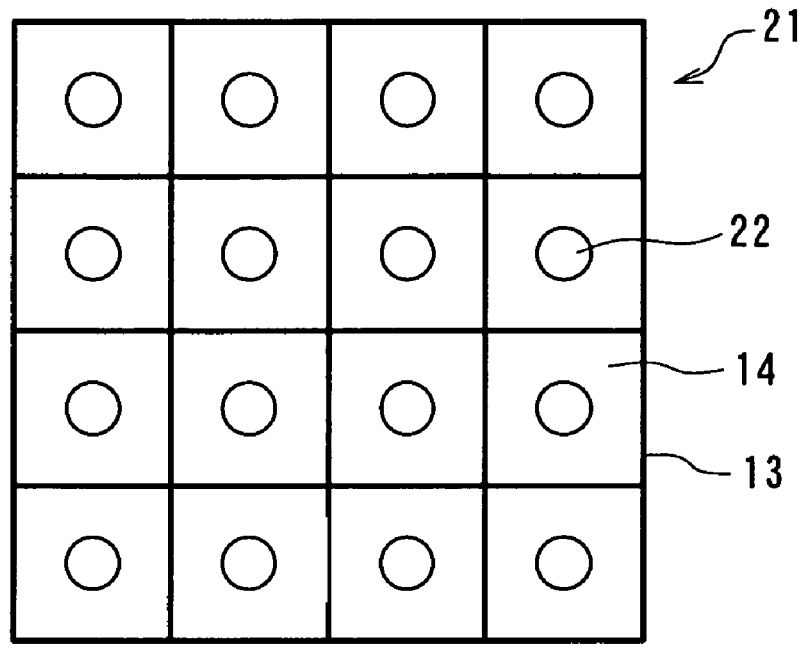
FIG. 6 is a schematic view showing one relation between the partition walls and the holes in the screen used in the present invention.
Figure 7:
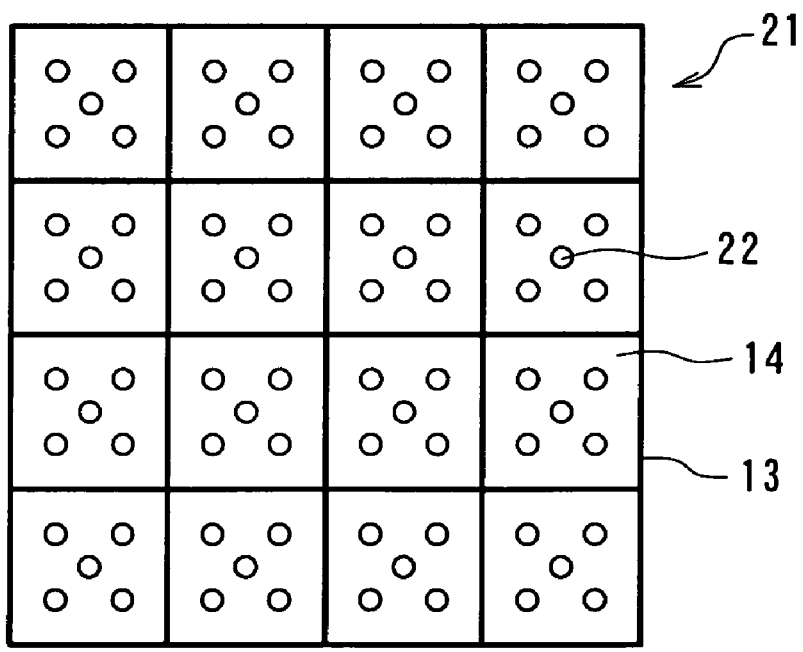
FIG. 7 is a schematic view illustrating another relation between the partition walls and the holes in the screen used in the present invention.
Figure 8:
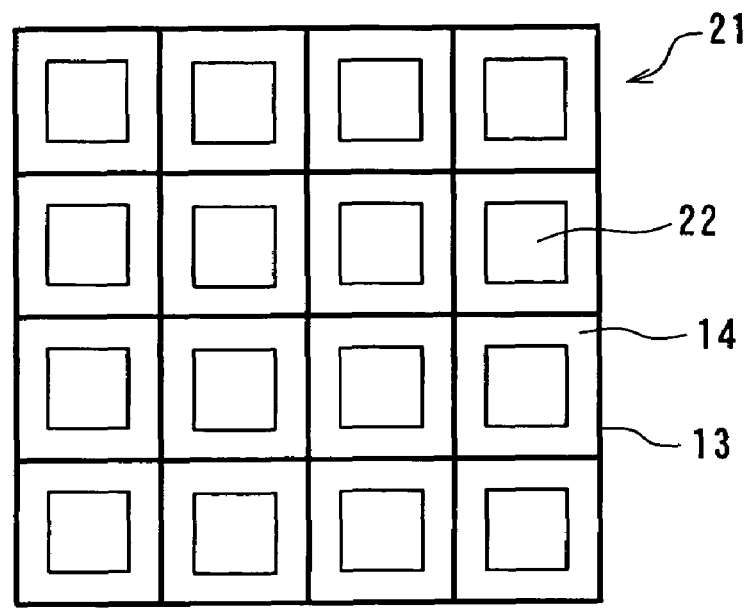
FIG. 8 is a schematic view depicting still another relation between the partition walls and the holes in the screen used in the present invention.
Figure 9:
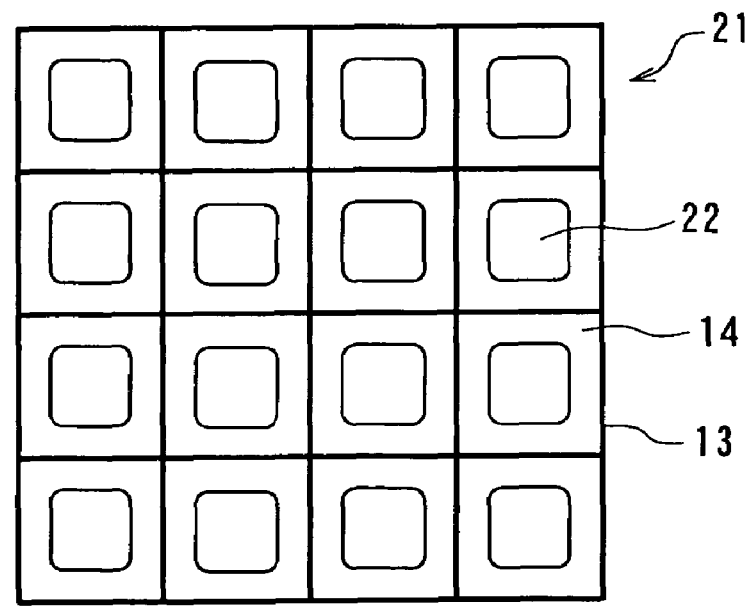
FIG. 9 is a schematic view showing still another relation between the partition walls and the holes in the screen used in the present invention.

FIG. 5 is a schematic view explaining another embodiment of the method of manufacturing the information display panel according to the invention. In the embodiment shown in FIG. 5: a numeral 11 is a substrate made of glass, polyethelene terephthalate and so on (corresponding to the substrate 1 or 2 in FIGS. 1 to 3); a numeral 12 is an electrode film made of ITO, metal and so on (corresponding to the electrode 5 or 6 in FIGS. 1 to 3); a numeral 13 is a partition wall for forming a cell 14 (corresponding to FIGS. 1 to 3); a numeral 21 is a screen made of a metal plate such as SUS and so on, in which the hole 22 are arranged; and a numeral 16 is a plate member (hereinafter, sometimes called as a squeegee). In the embodiment shown in FIG. 5, according to the invention, in the case of filling the display media 3 in the cell 14, the display media 3 are filled in the cell 14 through the screen 21 by setting the screen 21 over the partition walls 13; arranging the display media 3 on the screen 21; and moving the squeegee 16 on the screen 21 from one side to the other side under such a condition that the squeegee 16 is contacted to the screen 21.

In the embodiment shown in FIG. 5, as to a positional relation between the screen 21 and the holes 22, it is possible to preferably use the following cases: (1) such that the hole 22 is arranged at a portion completely corresponding one by one to the cell 14; (2) such that a plurality of holes 22 having a size sufficiently smaller than that of the cell 14 (filling amount can be made uniform and a variation of filling amount is difficult to occur in respective cells); and (3) such that the hole 22 is arranged at a portion completely synchronized with a position of the partition wall 13 and is not provided on the partition wall (no display media are arranged on the partition wall).

Moreover, in the embodiment shown in FIG. 5, as to a size of the hole 22 arranged to the screen 21, it is preferred that a total area of the holes 22 is in a range of 5%-70% with respect to an area of the cell 14.

Further, in the embodiment shown in FIG. 5, as to a shape of the hole 22, it is possible to preferably use the following cases: (1) such that a shape of the hole 22 is the same as that of the partition wall 13 (for example, hexagonal shape for the partition wall having hexagonal honeycomb shape, and square shape for the partition wall having square shape); and (2) such that the hole 22 has a rectangular shape in which a short side thereof is arranged in a direction to which the display media are not expected to be filled in the adjacent cell 14 (for color displaying, in the case of filling the display media having different colors in respective lines, use is made of the screen 21 having a rectangular hole 22 in which a long side thereof is arranged in a direction along which same color is continued, and, in which a short side thereof is arranged in a direction along which the cells 14 having different colors are arranged. Alternatively, use is made of the screen 21 having a oval hole 22 in which a long axis and a short axis are arranged in the same direction respectively).

FIGS. 6-16 are schematic views respectively showing one positional relation between the partition wall 13 and the hole 22 of the screen 21 used in the present invention. In the embodiments shown in FIGS. 6-16, in order to clarify the positional relation between the partition wall 13 and the hole 22, the partition wall 13, which is not viewed generally since it is covered with the screen 21, is described in the figure.

All the embodiments shown in FIGS. 6-9 show the partition wall, in which the square cell is arranged in the grid-like manner. In the embodiment shown in FIG. 6, the screen 21, in which the partition wall 13 formed by arranging the square cell in the grid-like manner and the circular hole 22 correspond one by one, is shown. In the embodiment shown in FIG. 7, the screen 21, in which the partition wall 13 formed by arranging the square cell in the grid-like manner and five circular small holes 22 correspond one by one, is shown. In the embodiment shown in FIG. 8, the screen 21, in which the partition wall 13 formed by arranging the square cell in the grid-like manner and the square hole 22 correspond one by one, is shown. In the embodiment shown in FIG. 9, the screen 21, in which the partition wall 13 formed by arranging the square cell in the grid-like manner and the square hole 22 having a round corner correspond one by one, is shown.

Figure 10:
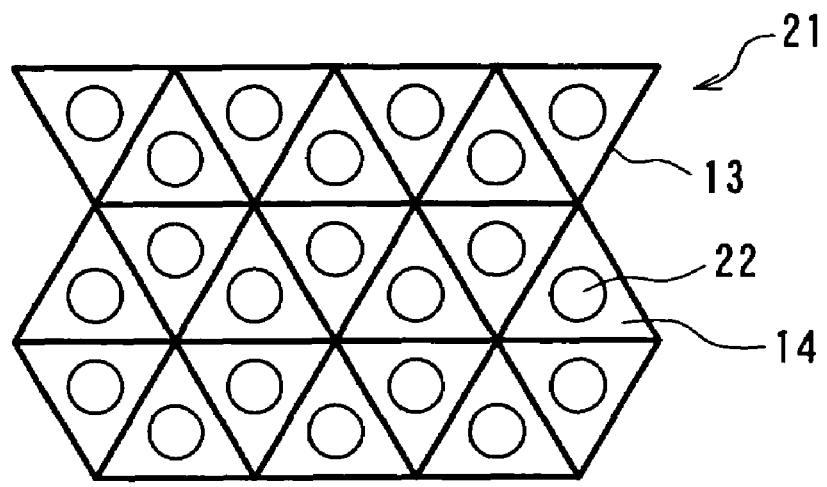
FIG. 10 is a schematic view illustrating still another relation between the partition walls and the holes in the screen used in the present invention.
Figure 11:
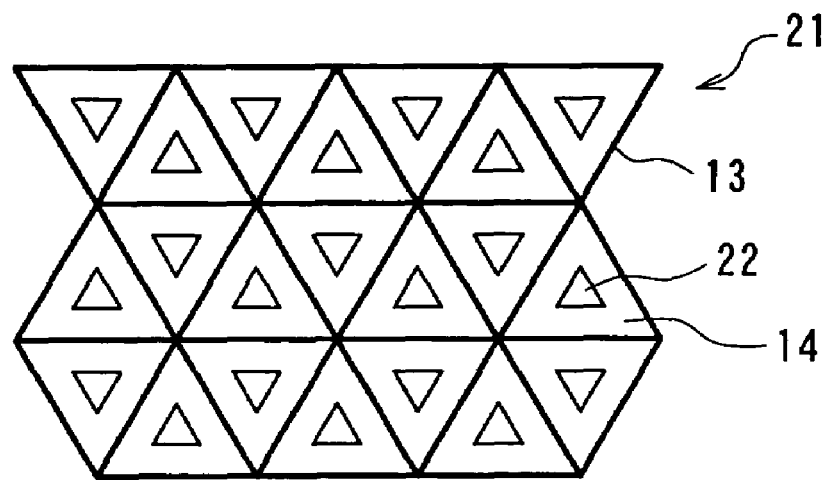
FIG. 11 is a schematic view depicting still another relation between the partition walls and the holes in the screen used in the present invention.
Figure 12:
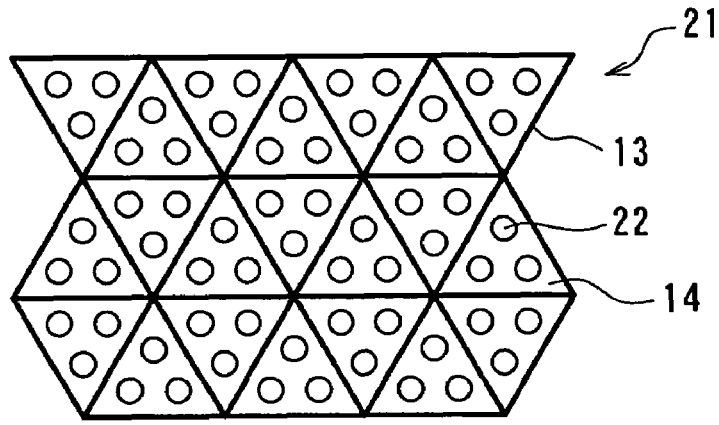
FIG. 12 is a schematic view showing still another relation between the partition walls and the holes in the screen used in the present invention.

All the embodiments shown in FIGS. 10-12 show the partition wall, in which the triangular cell is arranged in the honeycomb matrix manner. In the embodiment shown in FIG. 10, the screen 21, in which the partition wall 13 formed by arranging the triangular cell in the honeycomb matrix manner and the circular hole 22 correspond one by one, is shown. In the embodiment shown in FIG. 11, the screen 21, in which the partition wall 13 formed by arranging the triangular cell in the honeycomb matrix manner and the triangular hole 22 correspond one by one, is shown. In the embodiment shown in FIG. 12, the screen 21, in which the partition wall 13 formed by arranging the triangular cell in the honeycomb matrix manner and three circular small holes 22 correspond one by one, is shown.

Figure 13:
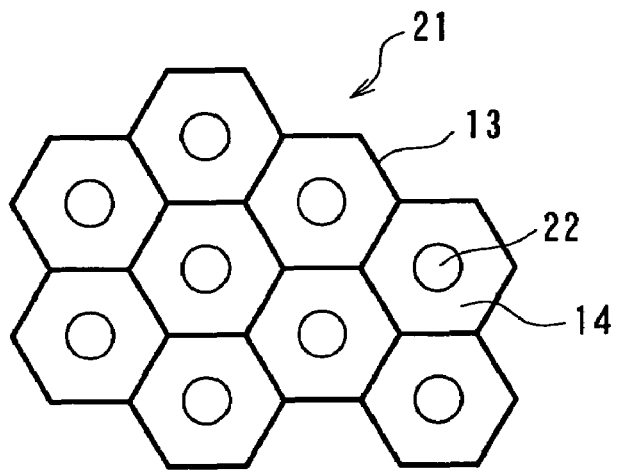
FIG. 13 is a schematic view illustrating still another relation between the partition walls and the holes in the screen used in the present invention.
Figure 14:
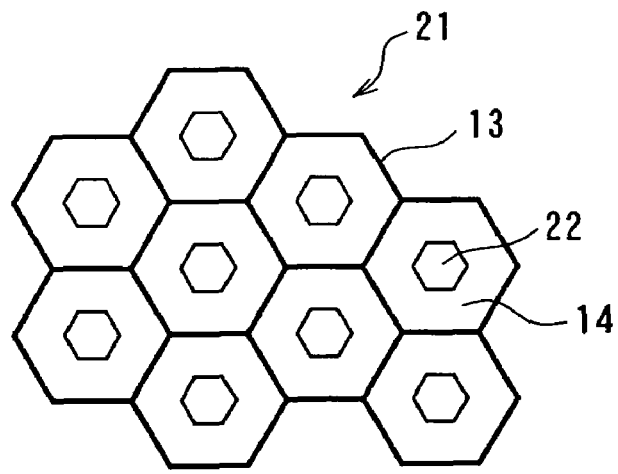
FIG. 14 is a schematic view depicting still another relation between the partition walls and the holes in the screen used in the present invention.
Figure 15:
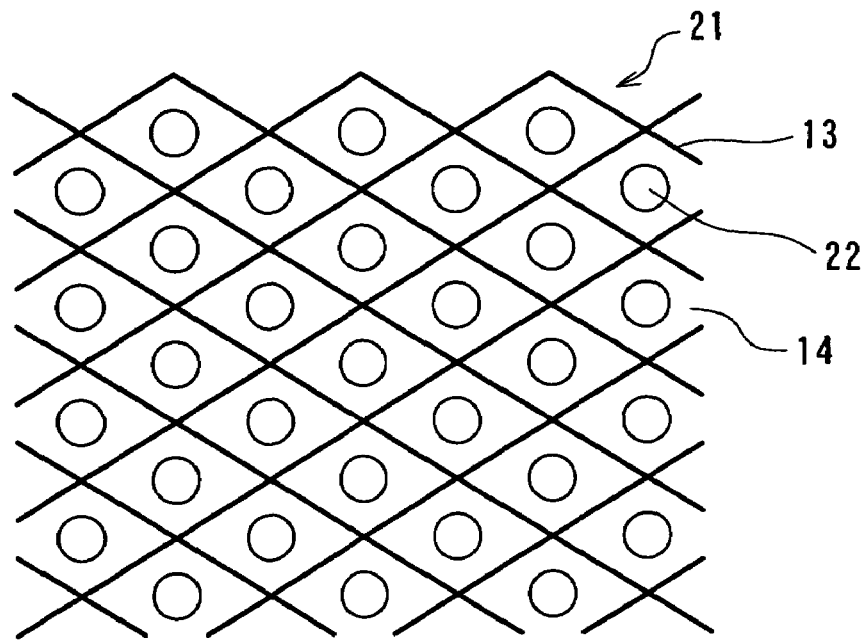
FIG. 15 is a schematic view showing still another relation between the partition walls and the holes in the screen used in the present invention.
Figure 16:
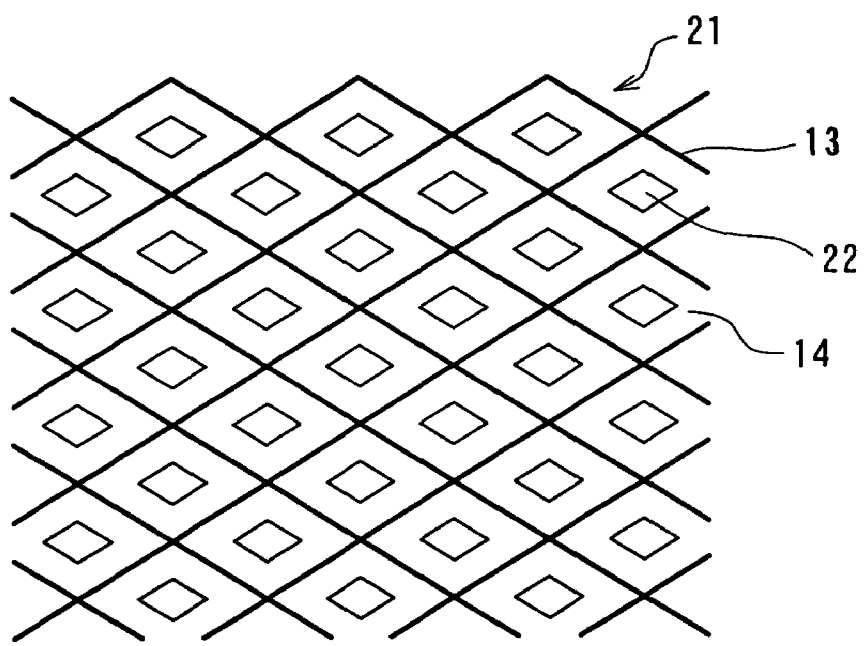
FIG. 16 is a schematic view illustrating still another relation between the partition walls and the holes in the screen used in the present invention.

All the embodiments shown in FIGS. 13 and 14 show the partition wall, in which the hexagonal cell is arranged in the honeycomb manner. In the embodiment shown in FIG. 13, the screen 21, in which the partition wall 13 formed by arranging the hexagonal cell in the honeycomb manner and the circular hole 22 correspond one by one, is shown. In the embodiment shown in FIG. 14, the screen 21, in which the partition wall 13 formed by arranging the hexagonal cell in the honeycomb manner and the hexagonal hole 22 correspond one by one, is shown. All the embodiments shown in FIGS. 15 and 16 show the partition wall, in which the rhombic cell is arranged in the grid-like manner. In the embodiment shown in FIG. 15, the screen 21, in which the partition wall formed by arranging the rhombic cell in the grid-like manner and the circular hole 22 correspond one by one, is shown. In the embodiment shown in FIG. 16, the screen 21, in which the partition wall formed by arranging the rhombic cell in the grid-like manner and the rhombic hole 22 correspond one by one, is shown.

FIGS. 17a-17d are schematic views respectively explaining another embodiment of the screen 21 used in the present invention. Here, as shown in FIG. 17a as one example, it is preferred to construct the screen 21, in which the holes 22 are continued corresponding to the cell 13 in a column direction and the holes 22 are arranged at every three cells in a row direction. By doing so, in the case such that the display media having three colors of R, G, B are to be filled in the cell 14 successively in a row direction, if the display media filling operation is performed three timed corresponding to the respective colors by shifting the screen 21 every one column correspondingly, the condition can be achieved such that the display media having one color among R, G, B are filled in a column direction and the display media having three colors of R, G, B are filled repeatedly in this order in a row direction. Then, if the opposed substrate is stuck to the above member, it is possible to easily obtain the information display panel for the color display. Moreover, if use is made of one screen 21 is sometimes mixed during the squeegee operation, and thus it is preferred to prepare plural screens 21 for respective color. In addition, if a position of the hole 22 of the screen 21 is arranged corresponding to a position of the cell 14 to be filled for respective three colors as shown in FIG. 17a for R color display media, FIG. 17b for G color display media, FIG. 17c for B color display media and FIG. 17d for black (K) color display media, it is further preferable since the screen positioning becomes easy.

When the display media having R, G, B, K colors are successively filled by using the screens shown in FIG. 17a, FIG. 17b and FIG. 17c are successively changed so as to fill the R-color display media, the G-color display media and the B-color display media successively in another cells. After that, the screen is changed to the screen 21 shown in FIG. 17d so as to fill the K-color (black color) display media in all the cells. In this manner, it is possible to manufacture the information display panel having the construction in which a combination of R-color and K-color, a combination of G-color and K-color, and a combination of B-color and K-color are filled in respective cells. In this case, if the W-color (white color) display media are used instead of the K-color (black color) display media, it is possible to manufacture the information display panel for the color display.

Figure 18:
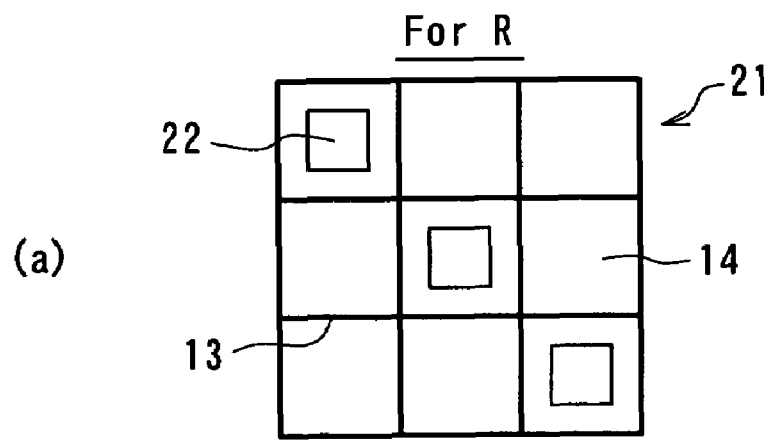
FIGS. 18a to 18c are schematic views respectively explaining still another embodiment of the screen 21 used in the present invention.
Figure 18:
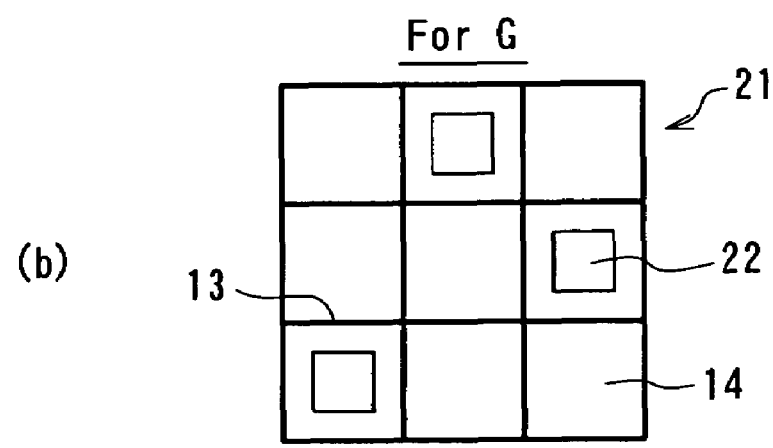
Figure 18:
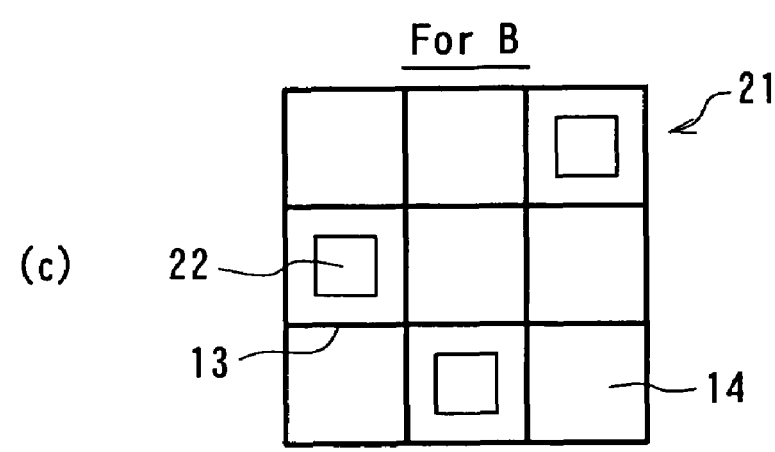
Figure 19:
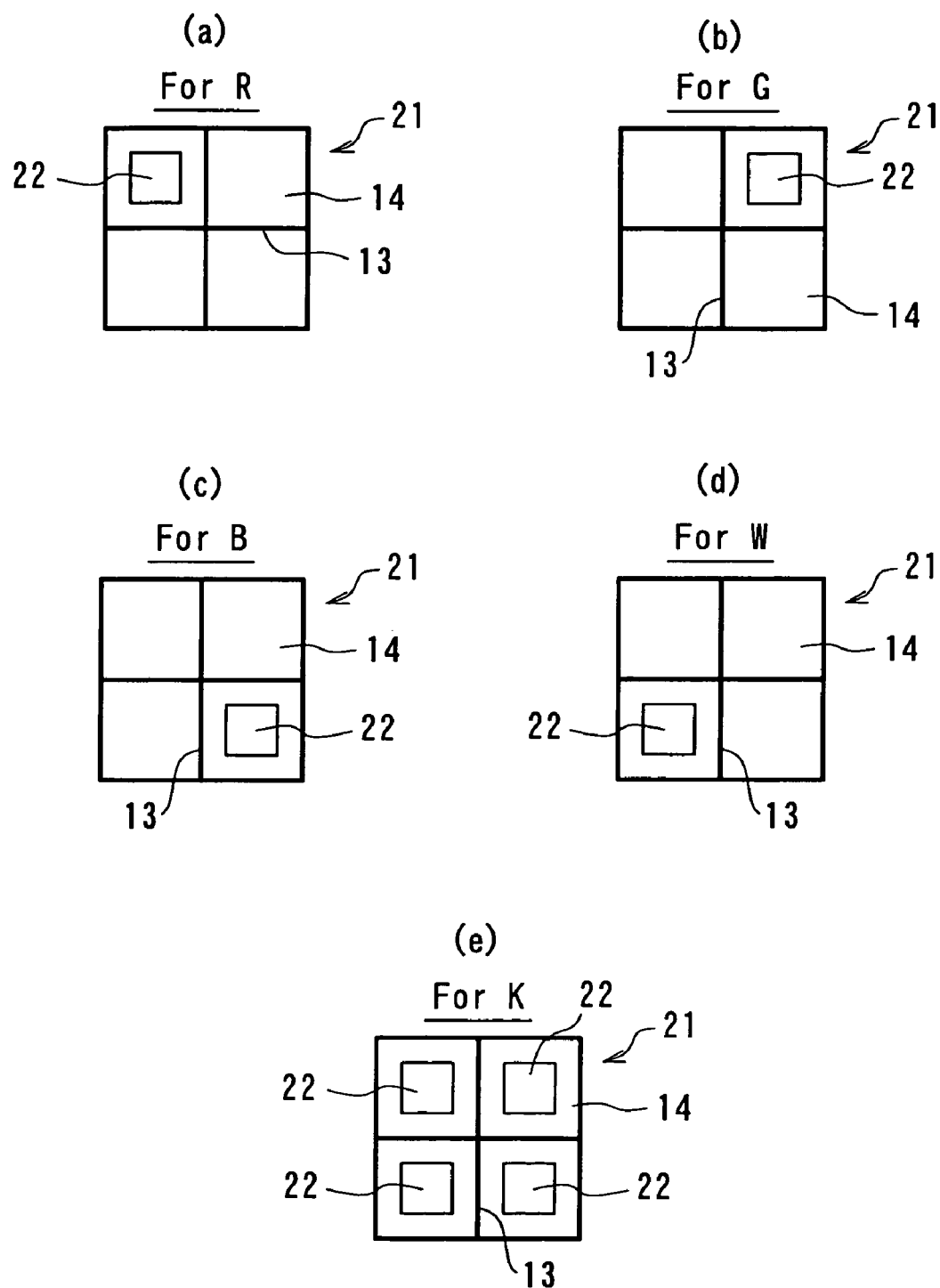
FIGS. 19a to 19e are schematic views respectively explaining still another embodiment of the screen 21 used in the present invention.

FIGS. 18a-18c and FIGS. 19a-19e are schematic views respectively explaining still another embodiment of the screen 21 used inn the present invention. In FIGS. 18a-18c, one unit of display is constructed by 3×3 cells 14, and, in FIGS. 19a-19e, one unit of display is constructed by 2×2 cells 14. In these figures, only the portion of the screen 21 corresponding to one unit of display, which is a minimum unit, is shown. In the embodiments shown in FIGS. 18a-18c, the screen 21 shown in FIG. 18a for R-color display media, the screen 21 shown in FIG. 18b for G-color display media, and the screen 21 shown in FIG. 18c for B-color display media are prepared respectively, and the screen 21 for respective color display media is used for filling respective color display media. In this manner, it is possible to obtain the information display panel for the color display, in which one unit of display is constructed by 3×3 cells 14. In the embodiments shown in FIGS. 19a-19d, the screen 21 shown in FIG. 19a for R-color display media, the screen 21 shown in FIG. 19b for G-color display media, the screen 21 shown in FIG. 19c for B-color display media, and the screen 21 shown in FIG. 19d for W-color display media are prepared respectively, and the screen 21 for respective color display media is used for filling respective color display media. After that, the screen for K-color shown in FIG. 19e for K-color display media is used for filling the K-color display media. In this manner, it is possible to obtain the information display panel for the color display, in which one unit of display is constructed by 2×2 cells 14. In this case, if the W-color (white color) display media are used instead of the K-color (black color) display media, it is possible to manufacture the information display panel for the color display.

In the present invention, the squeegee 16 means a plate-like member such as a plate-like rubber and a plate-like resin, which can move on the screen 15 (21) under such a condition that it is contacted to the screen, and may have an insulation property or a conductive property. As a material of the squeegee 16, use is made of a rubber material such as urethane rubber, natural rubber and other synthetic rubber, and a resin material such as polyester resin, nylon resin, polyamide resin. Moreover, as the squeegee, use is made of the metal plate coated by various rubber materials or various resin materials. In the case such that the display media are filled by using the squeegee 16, the squeegee is moved on the screen from one end to the other end at one time or a plurality times. Further, the cell 14 means a room surrounded by the partition walls 13. As a shape of the cell 14, use is made of a rectangular shape and a square shape corresponding to the electrode shape, and, further a triangular shape and a hexagonal shape corresponding not to the electrode shape. As a size of the cell 14, a length of one side is in a range of 50 μm-1000 μm in the case of the rectangular shape, and a distance between opposed apexes is in a range of 100 μm-1000 μm, preferably 100 μm-300 μm in the case of the honeycomb (hexagonal) shape.

FIGS. 20a, 20b, FIGS. 21a, 21b and FIG. 22 are schematic views respectively showing one relation among electrode/partition wall/hole of the screen in the information display panel, in which the electrode is arranged on the substrate, according to the invention.

Figure 20:
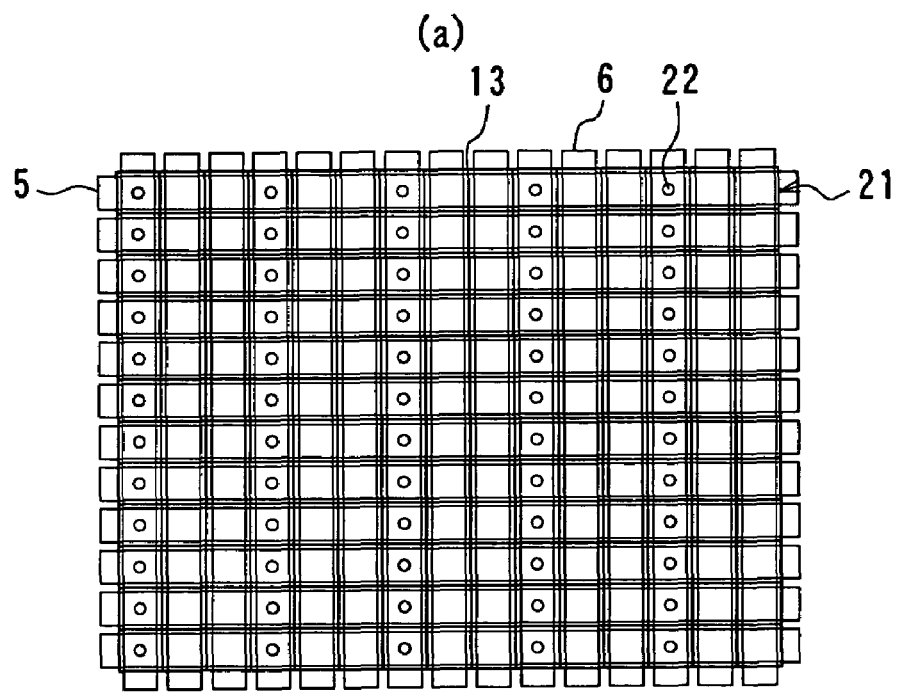
FIGS. 20a and 20b are schematic views respectively depicting one relation among electrode/partition wall/hole of the screen in the information display panel, in which the electrode is arranged on the substrate, according to the invention.
Figure 20:
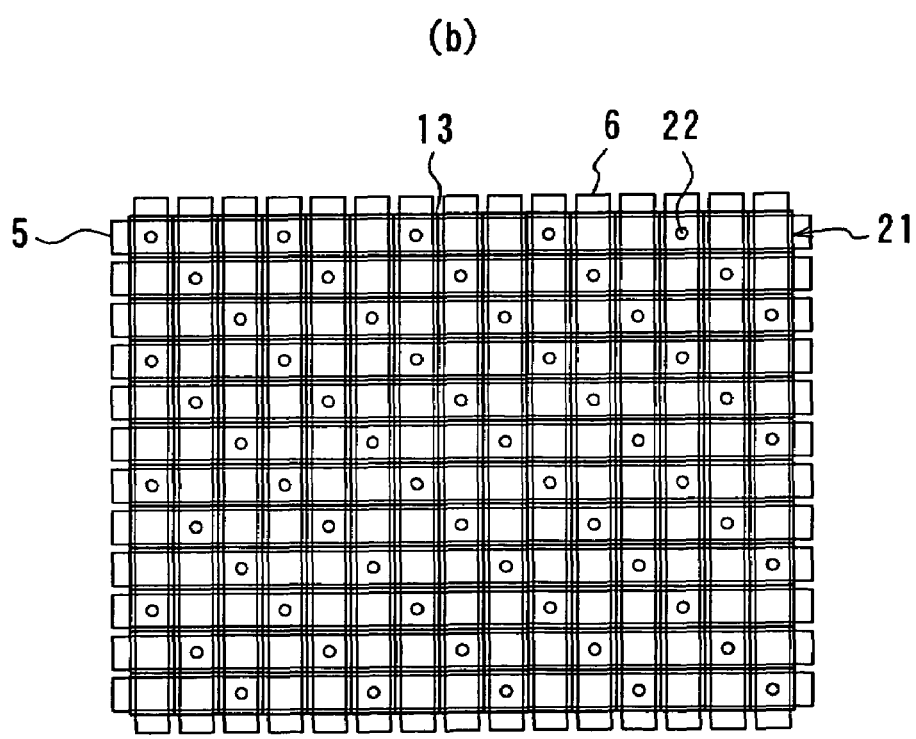

In the embodiments shown in FIGS. 20a and 20b, these members mentioned above and the pixel correspond one by one. That is, in the embodiments shown in FIGS. 20a and 20b, the three-dimensional intersected portion between the electrodes 5 and 6 and the pixel; the cell formed by the partition walls 13 and the pixel; and the hole 22 of the screen 21 and the pixel correspond respectively one by one. The different point between FIG. 20a and FIG. 20b is an arranging portion of the hole 22 arranged to the screen 21.

Figure 21:
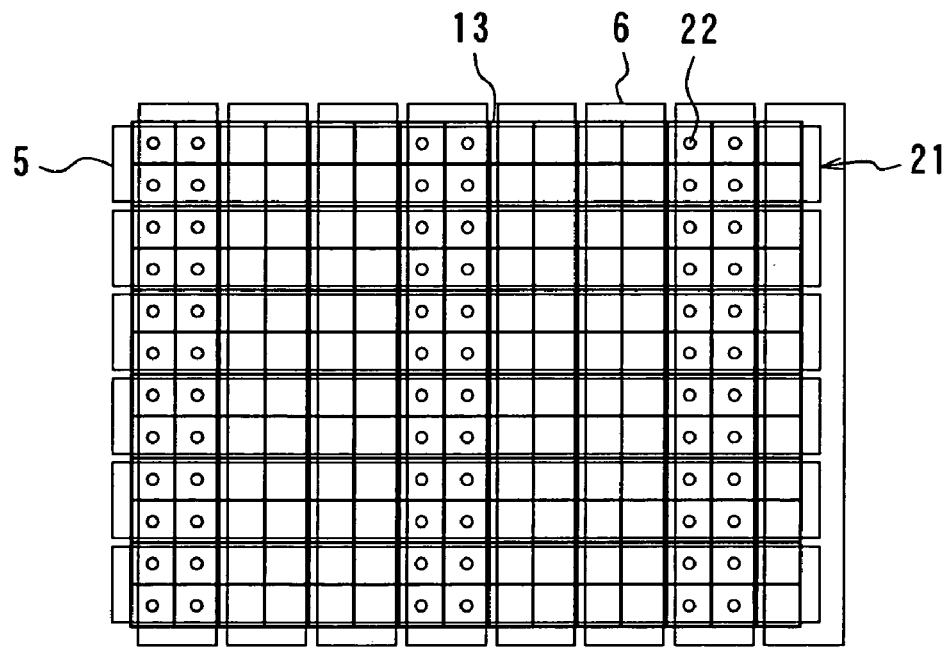
FIGS. 21a and 21b are schematic views respectively showing another relation among electrode/partition wall/hole of the screen in the information display panel, in which the electrode is arranged on the substrate, according to the invention.
Figure 21:
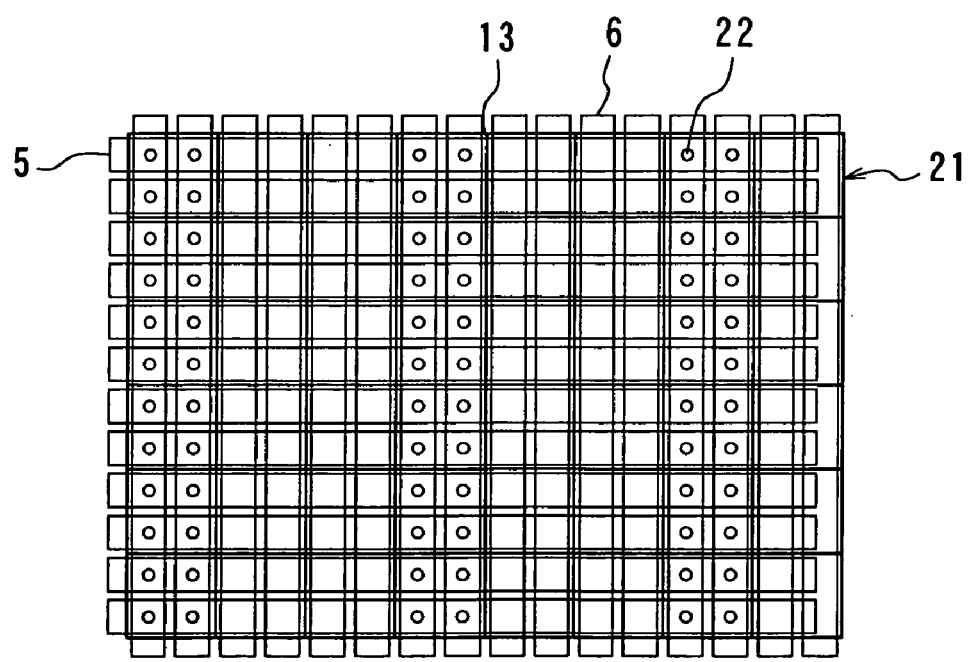

In the embodiments shown in FIGS. 21a and 21b, any of theses members mentioned above and the pixel don't correspond one by one. That is, in the embodiment shown in FIG. 21a, plural cells correspond to the electrode constituting one pixel. Specifically, the three-dimensional intersected portion between the electrodes 5 and 6 and the pixel correspond one by one, while four cells formed by the partition walls 13 and the pixel, and, four holes 22 of the screen 21 and the pixel correspond one by one respectively. In the embodiment shown in FIG. 21b, plural electrodes are arranged in one cell. Specifically, four three-dimensional intersected portions between the electrodes 5 and 6 and the pixel, and, four holes 22 of the screen 21 and the pixel correspond one by one respectively, while the cell formed by the partition walls 13 and the pixel correspond one by one.

Figure 22:
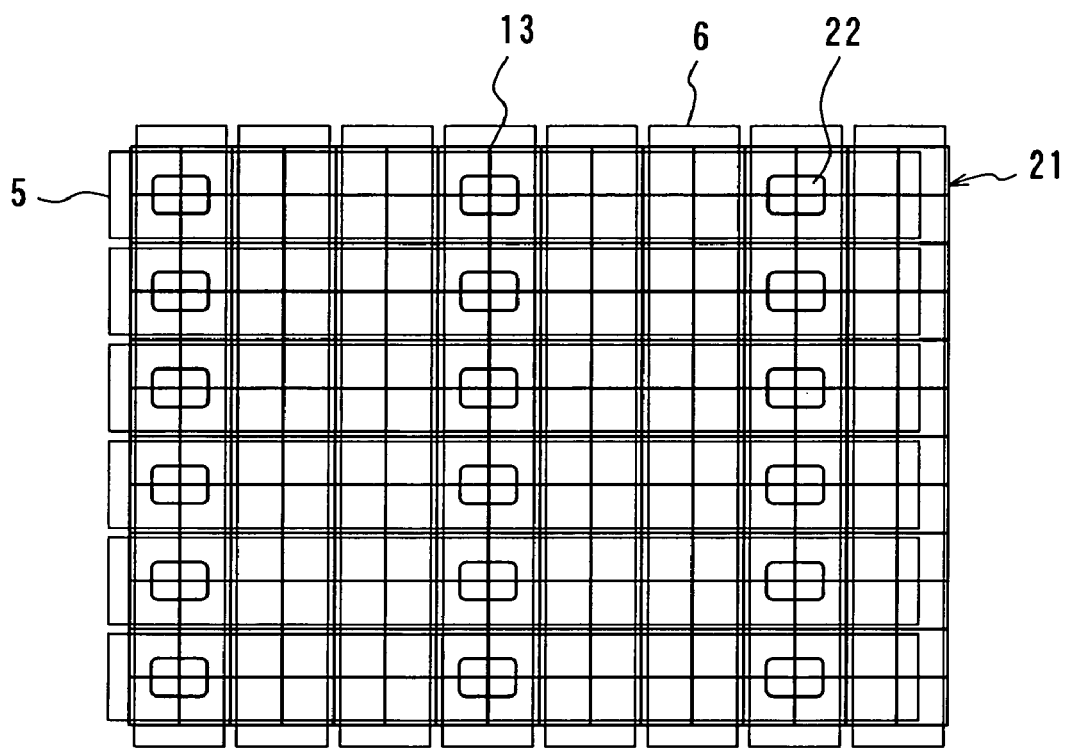
FIG. 22 is a schematic view illustrating still another relation among electrode/partition wall/hole of the screen in the information display panel, in which the electrode is arranged on the substrate, according to the invention.

In the embodiment shown in FIG. 22, any of these members mentioned above and the pixel don't correspond one by one. That is, in the embodiment shown in FIG. 22, the three-dimensional intersected portion between the electrodes 5 and 6 and the pixel, and, the hole 22 of the screen 21 and the pixel correspond one by one respectively, while four cells formed by the partition walls 13 and the pixel correspond one by one.

In the explanations mentioned above, in the case of filling the display media in the cell, only the predetermined screen is used. However, in the present invention, a mask having holes at a position, through which the display media are past, may be used in such a manner that the mask is set between the screen and the partition wall, and the display media may be filled in the cell by using the screen and the mask. In this case, as the screen, it is preferred to use the mesh screen in which resin fibers are knitted. Moreover, it is preferred to correspond a position of the cell formed by the partition walls and an arranging position of the hole of the mask one by one. Further, it is preferred to use the mask having a construction such that the holes are arranged continuously corresponding to the cells in either row direction or column direction and the holes are arranged every 1-4 cells in the other direction. Furthermore, in the case of arranging the electrode to the substrate, it is preferred that a position of arranging the electrodes and a position of arranging the holes of the screen correspond one by one.

Hereinafter, respective members constituting the information display panel, which is an object of the invention, will be explained.

As for the substrate, at least one of the substrates is the transparent substrate 2 through which a color of the display media can be observed from outside of the information display panel, and it is preferred to use a material having a high transmission factor of visible light and an excellent heat resistance. The substrate 1 may be transparent or opaque. Examples of the substrate material include polymer sheets such as polyethylene terephthalate, polyethylene naphthalate, polyether sulfone, polyethylene, polycarbonate, polyimide or acryl and metal sheets having flexibility and inorganic sheets such as glass, quartz or the like having no flexibility. The thickness of the substrate is preferably 2 to 5000 μm, more preferably 5 to 2000 μm. When the thickness is too thin, it becomes difficult to maintain strength and distance uniformity between the substrates, and when the thickness is thicker than 5000 μm, it is inconvenient for the thin information display panel.

As for materials for forming the electrodes provided if necessary, metals such as aluminum, silver, nickel, copper, gold and so on, conductive metal oxides such as indium tin oxide (ITO), indium oxide, antimony tin oxide (ATO), conductive tin oxide and conductive zinc oxide and so on, and conductive polymer such as polyaniline, polypyrrole, polythiophene and so on are listed and appropriately used. As the method for forming the electrode, the pattern forming method in which a thin film is formed from the above-listed materials by sputtering method, vacuum vapor deposition method, CVD (chemical vapor deposition) method, and coating method, or the pattern forming method in which the mixed solution of an conductive agent with a solvent or a synthetic resin binder is applied, are used. The electrode disposed on the front substrate 2 at the observation side should be transparent but the electrode disposed on the back substrate 1 may not be transparent. In both cases, above-mentioned conductive material capable of pattern forming can be preferably used. Additionally, the thickness of the electrode is preferable to be 3 to 1000 nm, more preferable to be 5 to 400 nm so that the electro-conductivity and optical transparency can be maintained. The material and the thickness of the electrode arranged on the back substrate 1 are similar to those of the electrode arranged at the display side, but transparency is not necessary. In this case, the applied outer voltage may be superimposed with a direct current or an alternate current.

Figure 23:
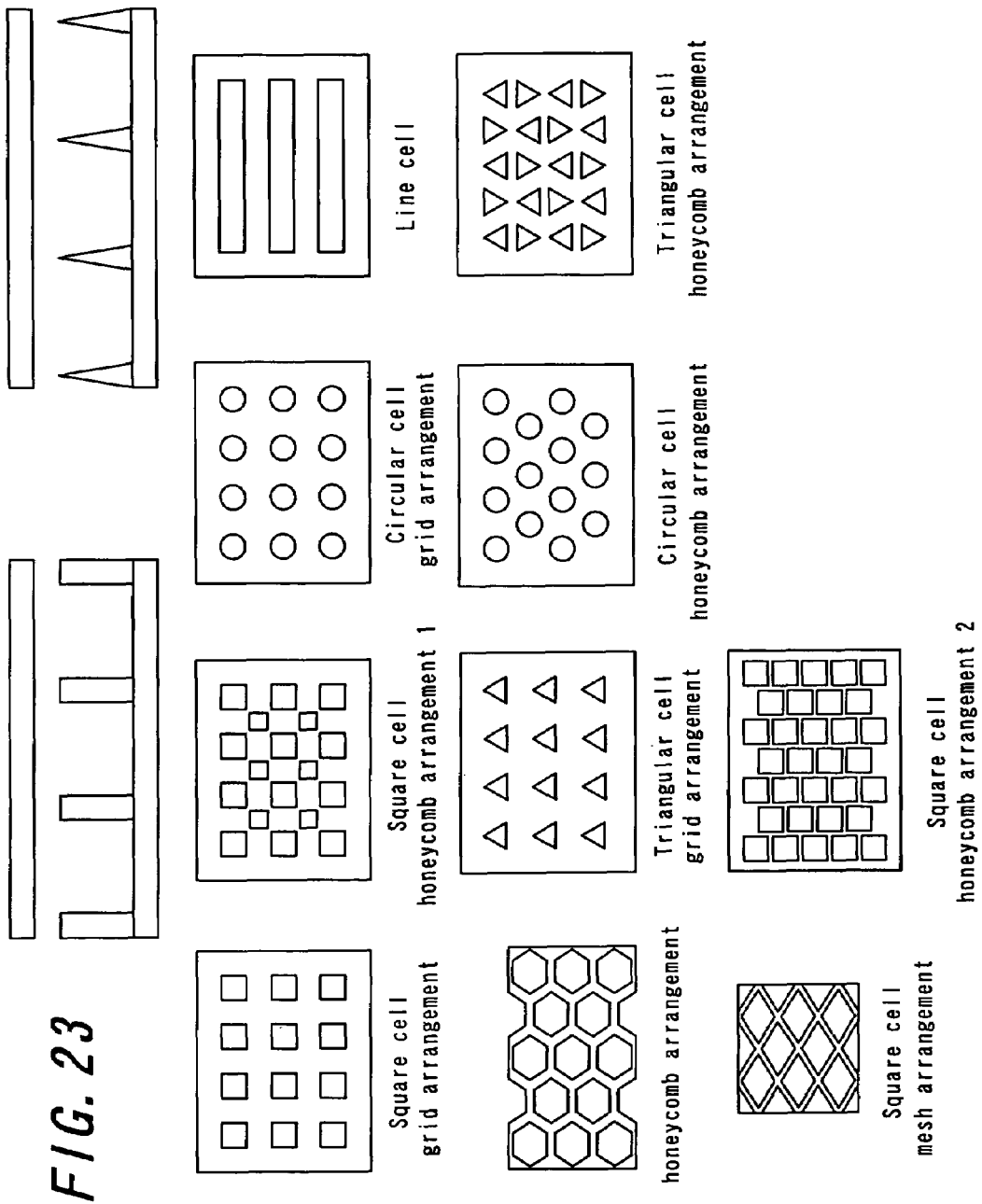
FIG. 23 is a schematic view depicting one embodiment of a shape of the partition walls in the information display panel, which is a manufacturing object of the invention.

A height and a width of the partition wall are suitably designed in accordance with a kind of the display media used for the display, and is not restricted. It is preferred to set a width of the partition wall to 2-100 µm more preferably 3-50 µm and to set a height of the partition wall to 10-500 µm more preferably 10-200 µm. As the shape in the information display panel obtained by sandwiching the front substrate and the back substrate, use is made of various shapes as shown in FIG. 23 in accordance with the shape of the partition walls. It is preferred that the portion corresponding to a cross section of the partition wall observed from the display side (an area of the frame portion of the display cell) should be made as small as possible, so that sharpness of the image display can be improved.

Then, the liquid powders for example used as the display media in the information display panel according to the present invention will be explained. The applicant has the right of the name of the liquid powders utilized in the information display panel of the present invention as "electric liquid powders (trade mark): registration number 4636931".

In the present invention, a term "liquid powders" means an intermediate material having both of liquid properties and particle properties and exhibiting a self-fluidity without utilizing gas force and liquid force. For example, a liquid crystal is defined as an intermediate phase between a liquid and a solid, and has a fluidity showing a liquid characteristic and an anisotropy (optical property) showing a solid characteristic (Heibonsha Ltd.: encyclopedia). On the other hand, a definition of the particle is a material having a finite mass even if it is vanishingly small and receives an attraction of gravity (Maruzen Co., Ltd.: physics subject-book). Here, even in the particles, there are special states such as gas-solid fluidized body and liquid-solid fluidized body. If a gas is flown from a bottom plate to the particles, an upper force is acted with respect to the particles in response to a gas speed. In this case, the gas-solid fluidized body means a state that is easily fluidized when the upper force is balanced with the gravity. In the same manner, the liquid-solid fluidized body means a state that is fluidized by a liquid. (Heibonsha Ltd.: encyclopedia) In the present invention, it is found that the intermediate material having both of fluid properties and solid properties and exhibiting a self-fluidity without utilizing gas force and liquid force can be produced specifically, and this is defined as the liquid powders.

That is, as is the same as the definition of the liquid crystal (intermediate phase between a liquid and a solid), the liquid powder according to the invention is a material showing the intermediate state having both of liquid properties and particle properties, which is extremely difficult to receive an influence of the gravity showing the particle properties mentioned above and indicates a high fluidity. Such a material can be obtained in an aerosol state i.e. in a dispersion system wherein a solid-like or a liquid-like material is floating in a relatively stable manner as a dispersant in a gas, and thus, in the information display panel according to the invention, a solid material is used as a dispersant.

In the information display panel of the present invention, the liquid powders composed of a solid material stably floating as a dispersant for example in a gas and exhibiting a high fluidity in an aerosol state are sealed between two opposed substrates, at least one substrate being transparent. Such liquid powders are too fluid to measure its repose angle, which is an index indicating fluidity of powders and can be made to move easily and stably by means of Coulomb's force and so on generated by applying a low voltage.

As mentioned above, the liquid powders as the display media for example used in the present invention means an intermediate material having both of liquid properties and particle properties and exhibiting a self-fluidity without utilizing gas force and liquid force. Such liquid powders become particularly an aerosol state. In the information display panel according to the invention, the liquid powders are used in a state such that a solid material is relatively stably floating as a dispersant in a gas.

Then, an example of particles for the display media (hereinafter, sometimes refer to particles) constituting the display media in the information display panel according to the invention will be explained. The particles for the display media are used as the display media constructed by only the particles for the display media, or the display media constructed by mixing them with the other particles, or the display media constructed by controlling them into the liquid powders.

The particles include resin as a main ingredient and, according to need, charge control agent, coloring agent, inorganic additives, as is the same as the known one. Hereinafter, typical examples of resin, charge control agent, coloring agent and other additive will be explained.

Typical examples of the resin include urethane resin, urea resin, acrylic resin, polyester resin, acryl urethane resin, acryl urethane silicone resin, acryl urethane fluorocarbon polymers, acryl fluorocarbon polymers, silicone resin, acryl silicone resin, epoxy resin, polystyrene resin, styrene acrylic resin, polyolefin resin, butyral resin, vinylidene chloride resin, melamine resin, phenolic resin, fluorocarbon polymers, polycarbonate resin, polysulfon resin, polyether resin, and polyamide resin. Two kinds or more of these may be mixed and used. For the purpose of controlling the adherence to the substrate, acryl urethane resin, acryl silicone resin, acryl fluorocarbon polymers, acryl urethane silicone resin, acryl urethane fluorocarbon polymers, fluorocarbon polymers, silicone resin are particularly preferable.

Though charge control agents are not particularly specified to the following examples, examples of the negative charge control agent include salicylic acid metal complex, metal containing azo dye, oil-soluble dye of metal-containing (containing a metal ion or a metal atom), the fourth grade ammonium salt-based compound, calixarene compound, boron-containing compound (benzyl acid boron complex), and nitroimidazole derivative. Examples of the positive charge control agent include nigrosine dye, triphenylmethane compound, the fourth grade ammonium salt-based compound, polyamine resin, imidazole derivatives. Additionally, metal oxides such as ultra-fine particles of silica, ultra-fine particles of titanium oxide, ultra-fine particles of alumina, and so on; nitrogen-containing circular compound such as pyridine, and so on, and these derivates or salts; and resins containing various organic pigments, fluorine, chlorine, nitrogen and the like can be employed as the charge control agent.

As for a coloring agent, various kinds of organic or inorganic pigments or dye with various colors as described below are usable.

Examples of black pigments include carbon black, copper oxide, manganese dioxide, aniline black, activate carbon and the like.

Examples of blue pigments include C.I. pigment blue 15:3, C.I. pigment blue 15, Berlin blue, cobalt blue, alkali blue lake, Victoria blue lake, phthalocyanine blue, metal-free phthalocyanine blue, partially chlorinated phthalocyanine blue, first sky blue, Indanthrene blue BC and the like.

Examples of red pigments include red oxide, cadmium red, diachylon, mercury sulfide, cadmium, permanent red 4R, lithol red, pyrazolone red, watching red, calcium salt, lake red D, brilliant carmine 6B, eosin lake, rhodamine lake B, alizarin lake, brilliant carmine 3B, C.I. pigment red 2 and the like.

Examples of yellow pigments include chrome yellow, zinc chromate, cadmium yellow, yellow iron oxide, mineral first yellow, nickel titanium yellow, navel orange yellow, naphthol yellow S, hansa yellow G, hansa yellow 10G, benzidine yellow G, benzidine yellow GR, quinoline yellow lake, permanent yellow NCG, tartrazinelake, C.I. pigment yellow 12 and the like.

Examples of green pigments include chrome green, chromium oxide, pigment green B, C.I. pigment green 7, Malachite green lake, final yellow green G and the like.

Examples of orange pigments include red chrome yellow, molybdenum orange, permanent orange GTR, pyrazolone orange, Balkan orange, Indanthrene brilliant orange RK, benzidine orange G, Indanthrene brilliant orange GK, C.I. pigment orange 31 and the like.

Examples of purple pigments include manganese purple, first violet B, methyl violet lake and the like.

Examples of white pigments include zinc oxide, titanium oxide, antimony white, zinc sulphide and the like.

Examples of extenders include baryta powder, barium carbonate, clay, silica, white carbon, talc, alumina white and the like. Furthermore, there are Nigrosine, Methylene Blue, rose bengal, quinoline yellow, and ultramarine blue as various dyes such as basic dye, acidic dye, dispersion dye, direct dye, etc.

Examples of inorganic additives include titanium oxide, zinc oxide, zinc sulphide, antimony oxide, calcium carbonate, pearl white, talc, silica, calcium silicate, alumina white, cadmium yellow, cadmium red, cadmium orange, titanium yellow, Berlin blue, Armenian blue, cobalt blue, cobalt green, cobalt violet, ion oxide, carbon black, manganese ferrite black, cobalt ferrite black, copper powder, aluminum powder and the like.

Inorganic additives among these coloring agents may be used alone or in combination with two or more kinds thereof. Particularly, carbon black is preferable as the black coloring agent, and titanium oxide is preferable as the white coloring agent.

The above-mentioned color agents are composed to obtain a certain color of particles for display media.

Moreover, it is preferable to use particles for display media (hereinafter, sometimes refer to particles) of the present invention, whose average particle diameter d(0.5) ranges between 1 to 20 μm and which are even. If the average particle diameter d(0.5) exceeds this range, the image sharpness is sometimes deteriorated, and, if the average particle diameter is smaller than this range, an agglutination force between the particles becomes too large to prevent the movement of the particles.

Further, in the present invention as for the particle diameter distribution, the particle diameter distribution Span, which is defined by the following formula, is less than 5 preferably less than 3:

Span=(d(0.9)−d(0.1))/d(0.5)

(here, d(0.5) means a value of the particle diameter expressed by μm wherein an amount of the particles having the particle size larger than or smaller than this value is 50%, d(0.1) means a value of the particle diameter expressed by μm wherein an amount of the particles having the particle size smaller than this value is 10%, and d(0.9) means a value of the particle size expressed by μm wherein an amount of the particles having the particle size smaller than this value is 90%).

When the Span is set to no more than 5, each particle has similar particle diameter to perform an even particle movement.

Furthermore, as for a correlation between each particles, it is crucial to set a ratio of d(0.5) of the particles having smallest diameter with respect to d(0.5) of the particles having largest diameter to not more than 50 preferably not more than 10. Even if the particle diameter distribution Span is made smaller, the particles having different charge properties with each other are moved in the opposite direction. Therefore, it is preferred that the particle diameters are formed closely with each other and equivalent amounts of the particles are easily moved in the opposite direction. To this end, the above range is obtained.

Here, the particle diameter distribution and the particle diameter mentioned above can be measured by means of a laser diffraction/scattering method. When a laser light is incident upon the particles to be measured, a light intensity distribution pattern due to a diffraction/scattering light occurs spatially. This light intensity distribution pattern corresponds to the particle diameter, and thus it is possible to measure the particle diameter and the particle diameter distribution.

In the present invention, the particle diameter and the particle diameter distribution are obtained by a volume standard distribution. Specifically, the particle diameter and the particle diameter distribution can be measured by means of a measuring apparatus Mastersizer 2000 (Malvern Instruments Ltd.) wherein the particles setting in a nitrogen gas flow are calculated by an installed analysis software (which is based on a volume standard distribution due to Mie's theory).

A charge amount of the particle for display media properly depends upon the measuring condition. However, it has been found that the charge amount of the particle for display media in the information display panel substantially depends upon an initial charge amount, a contact with respect to the partition walls, a contact with respect to the substrates, a charge decay due to an elapsed time, and specifically a saturation value of the particles for the display media during a charge behavior is a main factor.

After various investigations by the inventors, it is found that an adequate range of the charged values of the particles for display media can be estimated by performing a blow-off method utilizing the same carrier particles so as to measure the charge amount of the particles for display media.

Further, when the display Media driven in a gaseous space are applied to the dry type information display panel, it is important to control a gas surrounding the display media in a gap between the substrates, and a suitable gas control contributes an improvement of display stability. Specifically, it is important to set the relative humidity of the gas in the gap not more than 60% RH at 25° C., preferably not more than 50% RH.

The above gap means a gas portion surrounding the display media obtained by substituting occupied portions of the electrodes 5, 6 (in the case of arranging the electrodes inside the substrates), the display media 3 (particles or liquid powders), the partition walls 4, and a seal portion of the information display panel from the space between the opposed substrates 1 and 2 shown in FIGS. 1 to 3.

A kind of the gap gas is not limited as long as it has the humidity mentioned above, but it is preferred to use dry air, dry nitrogen gas, dry argon gas, dry helium gas, dry carbon dioxide gas, dry methane gas and so on. It is necessary to seal this gas in the information display panel so as to maintain the humidity mentioned above. For example, it is important to perform the operations of filling the display media and assembling the information display panel under an atmosphere having a predetermined humidity and to apply a seal member and a seal method for preventing a humidity inclusion from outside.

In the information display panel of the invention, a gap between the substrates may be adjusted so that the display media can be moved to maintain the contrast. The gap is adjusted normally to 10-500 µm, preferably 10-200 µm.

The volume occupied rate of the display media in the gap gas between the opposed substrates is preferably 5-70%, more preferably 5-60%. If the volume occupied rate of the display media exceeds 70%, the display media may become difficult to move, and if it is less than 5%, a sufficient contrast cannot be obtained and a sharp image display is not performed.

EXAMPLES

Hereinafter, the present invention will be explained further specifically with reference to examples and comparative examples. However, the present invention is not limited to the below experiment.

(Preparation of Display Media)

As the display media for the example and the comparative example, two groups of particles (particles A, particles B) having different charge characteristics were prepared.

The particles A were produced in such a manner that acrylic urethane resin: EAU53B (Asia Industry Co., Ltd.)/ IPDI bridging agent: Excel-Hardener HX (Asia Industry Co., Ltd.), carbon black (M100: Mitsubishi Chemical Corporation) 4 parts by weight, charge control agent: BontronN07 (Orient Chemical Industries Ltd.) 2 parts by weight were added, mixed, ground by a jet-mill and classified by Hybridizer (Nara Machinery Co. Ltd.) in such a manner that the particles were made to substantially circular shape by applying a mechanical impact strength. The thus produced particles A had an average particle diameter of 9.1 µm and were substantially circular black particles having negative charge characteristics.

The particles B were produced in such a manner tershally buthylmethacrylate monomer 80 parts by weight, methacrylic acid 2-(diethylamino) ethyl monomer 20 parts by weight, AIBN (azobisisobuthyronitrile) 0.5 parts by weight were dissolved, and titanium oxide treated by a coupling agent so as to be oleophic state 20 parts by weight was dispersed in the dissolved liquid. Then, the thus prepared liquid was suspended and polymerized by using a surface active agent (laurylic sodium sulphate) 0.5% of tenth times amount, and then subjected to a filtrating and drying process. Then, the particles were obtained by classifying the dried member by means of classifier (MDS-2: NIPPON PNEUMATIC MFG. CO., LTD.). The thus produced particles B had an average particle diameter of 8.5 µm and were substantially circular white particles having positive charge characteristics, and were used as the particles B.

(Manufacture of Panel Substrate)

A glass transparent substrate (7 cm×7 cm square) with ITO electrodes was prepared, and a rib having a height of 50 µm was formed on the substrate so as to form partition walls having a square shape and a grid-like arrangement.

The rib formation was performed as follows. A dry-film photoresist NIT 250 produced by Nichigo-Morton Co., Ltd., which is a photosensitive film, was laminated on a glass with ITO, and then exposure and development operations were performed thereto so as to form the desired partition walls having a line of 30 µm, a space of 320 µm and a pitch of 350 µm. As the other substrate, a glass transparent substrate (7 cm×7 cm square) with ITO electrodes was prepared.

Embodiment of Mesh Screen in Which Resin Fibers are Knitted

Example 1

Mixed Two Colors Display Media are Filled: Glass Substrate

As the display media 3, two groups of white and black particles (particles A and particles B) having different charge characteristics were mixed at a predetermined mixing rate, and the display media 3 were filled in the cell 14 according to the filling method of the display media 3 shown in FIG. 4. Then, the opposed substrates were sandwiched to form the information display panel. Filling conditions of the display media were as follows.

Construction of the screen 15:
   made of polyester, 100 mesh (100 lines/inch), line diameter: 55 µm, opening rate (mesh opening rate): 61%
Construction of the squeegee 16:
   made of urethane rubber
Construction of the substrate 11:
   glass substrate comprising ITO electrodes (with the partition walls 13)
Squeegee conditions:
   gap between the screen 15 and the substrate 11 (top portion of the partition wall 13): 3 mm (during squeegee, the screen 15 was contacted to the substrate 11 due to a pressing strength), squeegee speed: 10 cm/s
Filling amount: 15 g/m$^2$ During the manufacturing process of the information display panel according to this example, the estimation was performed about a filling condition of the display media. As a result, a filling amount was uniform on the overall surface of the substrate, and white/black unevenness was not detected by naked eyes. The results are shown in the following Table 1.

Example 2

Two Colors Display Media are Filled Successively: Glass Substrate

As the display media 3, two groups of white and black particles (particles A and particles B) having different charge characteristics were prepared, and the display media 3 were filled in the cell 14 successively according to the filling method shown in FIG. 5. Then, the opposed substrates were sandwiched to form the information display panel. Filling conditions of the display media were as follows.

Construction of the screen 21:
   made of polyester, 100 mesh (100 lines/inch), line diameter: 55 µm, opening rate (mesh opening rate): 61%
Construction of the squeegee 16:
   made of urethane rubber
Construction of the substrate 11:
   glass substrate comprising ITO electrodes (with the partition walls 13)
Squeegee conditions:
   gap between the screen 21 and the substrate 11 (top portion of the partition wall 13): 3 mm (during squeegee, the screen 21 was contacted to the substrate 11 due to a pressing strength), squeegee speed: 10 cm/s
Filling amount: 15 g/m$^2$ During the manufacturing process of the information display panel according to this example, the estimation was performed about a filling condition of the display media. As a result, a filling amount was uniform on the overall surface of the substrate, and white/black unevenness was not detected by naked eyes. The results are shown in the following Table 1.

Example 3

Two Colors Display Media are Filled Simultaneously: Resin Substrate

Two groups of particles (particles A and particles B) having different charge characteristics were filled in the cell 14 simultaneously by using the screen 15. As the screen 15, use was made of the screen having the characteristics of: made of polyester; 100 mesh (100 lines/inch); line diameter: 55 μm; and opening rate (mesh opening rate): 61%. The hexagonal cell 14 having an opposing corner length of 300 μm was formed on the PET substrate 11 with ITO electrodes by means of the partition walls 13. A height of the partition wall 13 was set to 50 μm.

The display media, in which the particles A and the particles B were mixed by 1:1.2 in weight, were prepared. The screen 15 mentioned above was set on the substrate; the mixed display media were arranged on the screen 15; and the mixed display media were filled in the cell 14 by moving the squeegee 16 made of urethane rubber on the screen 15 by two reciprocations. As the squeegee 16 made of urethane rubber, use was made of the squeegee having a rubber hardness of 90°. The substrate, to which the mixed display media were filled simultaneously, and the opposed substrate were sandwiched to form the information display panel. A filling amount of the mixed display media was set to 25 g/m².

In the information display panel manufactured according to the method mentioned above, a filling amount was uniform on the overall surface of the substrate, and white/black unevenness was not detected by naked eyes. The results are shown in the following Table 1.

Comparative Example 1

As is the same as the example 1, the partition walls were formed on the transparent glass substrate with ITO electrodes; the display media, in which two groups of particles were mixed; and the squeegee operation was performed under such a condition that the squeegee was not directly contacted to the surface of the substrate (the top portion of the partition wall). In this case, use was made of the same display media, electrodes, and squeegee conditions as those of the example 1. During the manufacturing process of the information display panel according to the comparative example 1, the estimation was performed about a filling condition of the display media. As a result, a sufficient amount of the display media was not filled, and a portion, in which substantially no display media were filled, was detected by naked eyes. The results are shown in the following Table 1.

TABLE 1

|  | Example 1 | Example 2 | Example 3 | Comparative example 1 |
|---|---|---|---|---|
| Condition after filling the display media | Filling amount was uniform on overall surface, and white/black unevenness was not detected | Filling amount was uniform on overall surface, and white/black unevenness was not detected | Filling amount was uniform on overall surface, and white/black unevenness was not detected | Sufficient amount was not filled, and no-filled cell was detected |

TABLE 1-continued

|  | Example 1 | Example 2 | Example 3 | Comparative example 1 |
|---|---|---|---|---|
| Time required for forming panel (assumed known method as 1) | 1/20 | 1/10 | 1/20 | 1 |

Embodiment of Metal Plate Screen Having Holes

Example 11

Two Colors Display Media are Filled Successively: Glass Substrate

Two groups of particles (particles A and particles B) having different charge characteristics were filled in the cell 14 successively by using the screen 21. As the screen 21, use was made of the screen in which the holes 22 having a diameter of 100 μm were arranged to the stainless steel plate having a thickness of 80 μm at a position corresponding to the cell 14. The square cell 14 having a size of 320 μm×320 μm was formed on the glass substrate 11 with ITO electrodes by means of the partition walls 13. An area of the holes 22 of the screen 21 was 7.6% with respect to an area of the cells 14. A height of the partition wall 13 was set to 50 μm.

At first, the screen 21 mentioned above was set on the substrate 11; the black color particles (particles A) were arranged on the screen 21; and the black color particles were filled in the cell 14 by moving the squeegee 16 made of urethane rubber on the screen 21 by two reciprocations. Then, the white color particles (particles B) were arranged on the screen 21, in which the holes 22 having the same diameter as the above, and the white color particles were filled in the cell 14 by moving the squeegee 16 made of urethane rubber in the same manner as the above by three reciprocations. As the squeegee 16 made of urethane rubber, use was made of the squeegee having a rubber hardness of 90°. The substrate, to which the black color particles and the white color particles were filled successively, and the opposed substrate were sandwiched to form the image display panel. A filling amount was set to 8 g/m² for the black color particles and the white color particles respectively.

In the information display panel manufactured according to the method mentioned above, a filling amount was uniform on the overall surface of the substrate, and white/black unevenness was not detected by naked eyes. The results are shown in the following Table 2.

Example 12

Two Colors Display Media are Filled Successively: Resin Substrate

Two groups of particles (particles A and particles B) having different charge characteristics were filled in the cell 14 successively by using the screen 21. As the screen 21, use was made of the screen in which the holes 22 having a diameter of 80 μm were arranged to the stainless steel plate having a thickness of 80 μm at a position corresponding to the cell 14. The hexagonal cell 14 having an opposing corner length of 300 μm was formed on the PET substrate 11 with ITO electrodes by means of the partition walls 13. An area of the holes 22 of the screen 21 was 8.6% with respect to an area of the cells 14. A height of the partition wall 13 was set to 60 μm.

At first, the screen 21 mentioned above was set on the substrate 11; the black color particles (particles A) were arranged on the screen 21; and the black color particles were filled in the cell 14 by moving the squeegee 16 made of urethane rubber on the screen 21 by two reciprocations. Then, the white color particles (particles B) were arranged on the screen 21, in which the holes 22 having the same diameter as the above, and the white color particles were filled in the cell 14 by moving the squeegee 16 made of urethane rubber in the same manner as the above by three reciprocations. As the squeegee 16 made of urethane rubber, use was made of the squeegee having a rubber hardness of 90°. The substrate, to which the black color particles and the white color particles were filled successively, and the opposed substrate were sandwiched to form the image display panel. A filling amount was set to 8 g/m² for the black color particles and the white color particles respectively.

In the information display panel manufactured according to the method mentioned above, a filling amount was uniform on the overall surface of the substrate, and white/black unevenness was not detected by naked eyes. The results are shown in the following Table 2.

Example 13

Two Colors Display Media are Filled Simultaneously: Resin Substrate

Two groups of particles (particles A and particles B) having different charge characteristics were filled in the cell 14 simultaneously by using the screen 21. As the screen 21, use was made of the screen in which the holes 22 having a diameter of 120 μm were arranged to the stainless steel plate having a thickness of 80 μm at a position corresponding to the cell 14. The hexagonal cell 14 having an opposing corner length of 300 μm was formed on the PET substrate 11 with ITO electrodes by means of the partition walls 13. An area of the holes 22 of the screen 21 was 19% with respect to an area of the cells 14. A height of the partition wall 13 was set to 50 μm.

The display media, in which the particles A and the particles B were mixed by 1:1.2 in weight, were prepared. The screen 21 mentioned above was set on the substrate; the thus mixed display media were arranged on the screen 21; and the mixed display media were filled in the cell 14 by moving the squeegee 16 made of urethane rubber on the screen 21 by two reciprocations. As the squeegee 16 made of urethane rubber, use was made of the squeegee having a rubber hardness of 90°. The substrate, to which the mixed display media were filled simultaneously, and the opposed substrate were sandwiched to form the information display panel. A filling amount of the mixed display media was set to 15 g/m².

In the information display panel manufactured according to the method mentioned above, a filling amount was uniform on the overall surface of the substrate, and white/black unevenness was not detected by naked eyes. The results are shown in the following Table 2.

Comparative Example 11

The mixed display media used in the example 13 were arranged directly on the substrate without using the screen 21, and the filling operation was tried to perform. However, the particles constituting the display media were scattered and the display media could not be filled. The results are shown in the following Table 2.

TABLE 2

| | Example 11 | Example 12 | Example 13 | Comparative example 11 |
|---|---|---|---|---|
| Condition after filling the display media | Filling amount was uniform on overall surface, and white/black unevenness was not detected | Filling amount was uniform on overall surface, and white/black unevenness was not detected | Filling amount was uniform on overall surface, and white/black unevenness was not detected | Filling operation could not be performed |
| Time required for forming panel (assumed known method as 1) | 1/10 | 1/10 | 1/20 | — |

Embodiment in Which Plural Groups of the Display Media are Filled by Using the Screen

[Display Media]

In the example and the comparative example mentioned below, as the display media, use was made of three colors display media of R (red color), G (green color), and B (blue-violet color) having same charge characteristics and black color display media (particle K) having different charge characteristics as that of the above three colors display media.

(Black Color Display Media)

3 parts by weight of nigrosine compound (Bontoron N07: product of Orient Chemical Industries, Ltd.) as a positive charge control agent, and, 5 parts by weight of carbon black (SPECIAL BLACK: product of Degussa) as black pigment were dispersed by a sand mill in 60 parts by weight of methyl methacrylate monomer (KANTO CHEMICAL CO., INC.) and 40 parts by weight (about 25 mol %) of ethylene glycol di-methacrylate (Wako Pure Chemical Industries, Ltd.) as multifunctional monomer having a plurality of polymerization reaction groups in one molecule; 5 parts by weight of (acrylic or methacrylic) resin—hydrocarbon resin block copolymer (MODIPER F600: product of NOF CORPORATION) was dissolved therein; and then 2 parts by weight of lauryl peroxide (PEROYL L: product of NOF CORPORATION) was further dissolved therein so as to obtain a liquid. The obtained liquid was suspended and polymerized in a purified water in which 0.5% of polyoxyethylene ether sodium sulfate (LATEMURU E-118B: product of KAO CORPORATION) as a surface active agent was added, and then the thus polymerized liquid was subjected to a filtering and drying process. Then, the particles for positive black color display media having an average particle diameter of 9.2 μm were obtained by classifying the dried member by means of classifier (MDS-2: NIPPON PNEUMATIC MFG. CO., LTD.).

(Red Color Display Media)

5 pats by weight of phenolic condensate (Bontron E89: product of Orient Chemical Industries, Ltd.) as a negative charge control agent, and, 5 parts by weight of red pigment (C.I. pigment red 2) were dispersed by a sand mill in 60 parts by weight of styrene monomer (KANTO CHEMICAL CO., INC.) and 40 parts by weight (about 35 mol %) of divinyl-benzen (DVB-960: product of Nippon Steel Chemical Co., Ltd.), and then 2 parts by weight of lauryl peroxide (PEROYL L: product of NOF CORPORATION) was dissolved therein so as to obtain a liquid. The obtained liquid was suspended and polymerized in a purified water in which 0.5% of LATE- MURU E-118B (product of KAO CORPORATION) as a surface active agent was added, and then the polymerized liquid was subjected to a filtering and drying process. Then, the particles for negative red color display media having an average particle diameter of 8.5 μm were obtained by classifying the dried member by means of classifier (MDS-2: NIPPON PNEUMATIC MFG. CO., LTD.).

(Green Color Display Media)

5 pats by weight of phenolic condensate (Bontron E89: product of Orient Chemical Industries, Ltd.) as a negative charge control agent, and, 5 parts by weight of green pigment (C.I. pigment green 7) were dispersed by a sand mill in 60 parts by weight of styrene monomer (KANTO CHEMICAL CO., INC.) and 40 parts by weight (about 35 mol %) of divinylbenzen (DVB-960: product of Nippon Steel Chemical Co., Ltd.), and then 2 parts by weight of lauryl peroxide (PEROYL L: product of NOF CORPORATION) was dissolved therein so as to obtain a liquid. The obtained liquid was suspended and polymerized in a purified water in which 0.5% of LATEMURU E-118B (product of KAO CORPORATION) as a surface active agent was added, and then the polymerized liquid was subjected to a filtering and drying process. Then, the particles for negative green color display media having an average particle diameter of 8.2 μm were obtained by classifying the dried member by means of classifier (MDS-2: NIPPON PNEUMATIC MFG. CO., LTD.).

(Blue Violet Color Display Media)

5 pats by weight of phenolic condensate (Bontron E89: product of Orient Chemical Industries, Ltd.) as a negative charge control agent, and, 5 parts by weight of blue violet pigment (C.I. pigment blue 15) were dispersed by a sand mill in 60 parts by weight of styrene monomer (KANTO CHEMICAL CO., INC.) and 40 parts by weight (about 35 mol %) of divinylbenzen (DVB-960: product of Nippon Steel Chemical Co., Ltd.), and then 2 parts by weight of lauryl peroxide (PEROYL L: product of NOF CORPORATION) was dissolved therein so as to obtain a liquid. The thus obtained liquid was suspended and polymerized in a purified water in which 0.5% of LATEMURU E-118B (product of KAO CORPORATION) as a surface active agent was added, and then the polymerized liquid was subjected to a filtering and drying process. Then, the particles for negative blue violet color display media having an average particle diameter of 8.4 μm were obtained by classifying the dried member by means of classifier (MDS-2: NIPPON PNEUMATIC MFG. CO., LTD.).

[Estimation 1]

Display media filling conditions of the thus manufactured image display panel were estimated by naked eyes by means of an optical microscope with a magnification of several tenth to several hundreds times.

[Estimation 2]

The thus manufactured information display panel was installed in an image display device, and a predetermined color test pattern was displayed by using a power supply of 250V. Then, a quality of the displayed image was estimated by an observation with naked eyes.

Example 21

Plural Groups of Display Media are Filled Successively

At first, black color display media (particles K) were filled according to the display media filling method shown in FIG. 5 for filling common color particles in all the cells by using the screen 21 (screen for K) shown in FIG. 17d. Then, R, G, B three groups of display media (particles A, particles B, particles C) were filled successively, according to the display media filling method shown in FIG. 5 for filling three color display media respectively in the cells, in such a manner that R, G, B three color display media were filled in the cells respectively along a row direction, by using successively the screens 21 (screen for R, screen for G, screen for B) shown in FIGS. 17a to 17c. Then, the opposed substrates were sandwiched to form the information display panel. Filling conditions of the display media were as follows. The results are shown in the following Table 3.

Construction of the squeegee 16:
    made of urethane rubber

Construction of the substrate 11:
    glass substrate comprising ITO electrodes (with the partition walls 13)

Construction of the screen 21:
    circular holes having a diameter of 200 μm, arranging every three pixels in a line manner (corresponding to R, G, B)

Squeegee conditions:
    three times for respective R, G, B, three squeezing operations by using every three screens 21 in every times, filling the display media selectively for R, G, B by every three lines Example 22

Plural Groups of Display Media are Filled as Mixed Display Media Having Two Groups Among Them Three groups of mixed display media (R/K, G/K, B/K) in which black color display media (particles K) and respective R, G, B three groups of display media (particles A, particles B, particles C) were mixed in a predetermined mixing ratio, were filled successively, according to the display media filling method shown in FIG. 5 for filling three color display media respectively in the cells, in such a manner that R/K, G/K, B/K three groups of mixed display media were filled in the cells respectively along a row direction, by using successively the screens 21 (screen for R, screen for G, screen for B) shown in FIGS. 17a to 17c. Then, the opposed substrates were sandwiched to form the information display panel. Filling conditions of the display media were as follows. The results are shown in the following Table 3.

Construction of the squeegee 16:
    made of urethane rubber

Construction of the substrate 11:
    glass substrate comprising ITO electrodes (with the partition walls 13)

Construction of the screen 21:
    circular holes having a diameter of 200 μm, arranging every three pixels in a line manner (corresponding to R, G, B)

Squeegee conditions:
    three times for respective R/K, G/K, B/K, three squeezing operations by using every three screens 21 in each time, filling the display media selectively for R/K, G/K, B/K by every three lines Comparative Example 21

Figure 17:
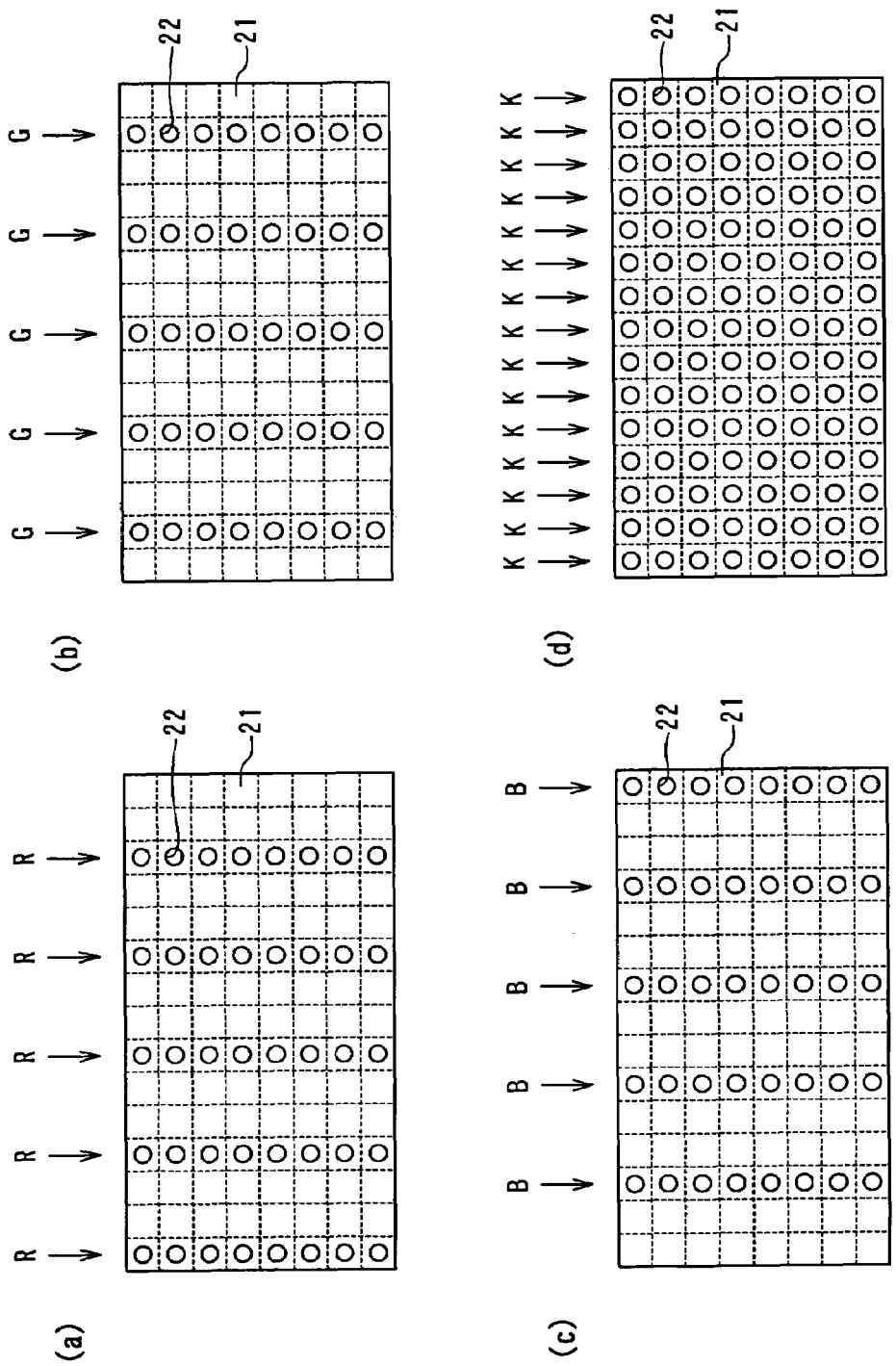
FIGS. 17a to 17d are schematic views respectively explaining another embodiment of the screen used in the present invention.
Figure 24:
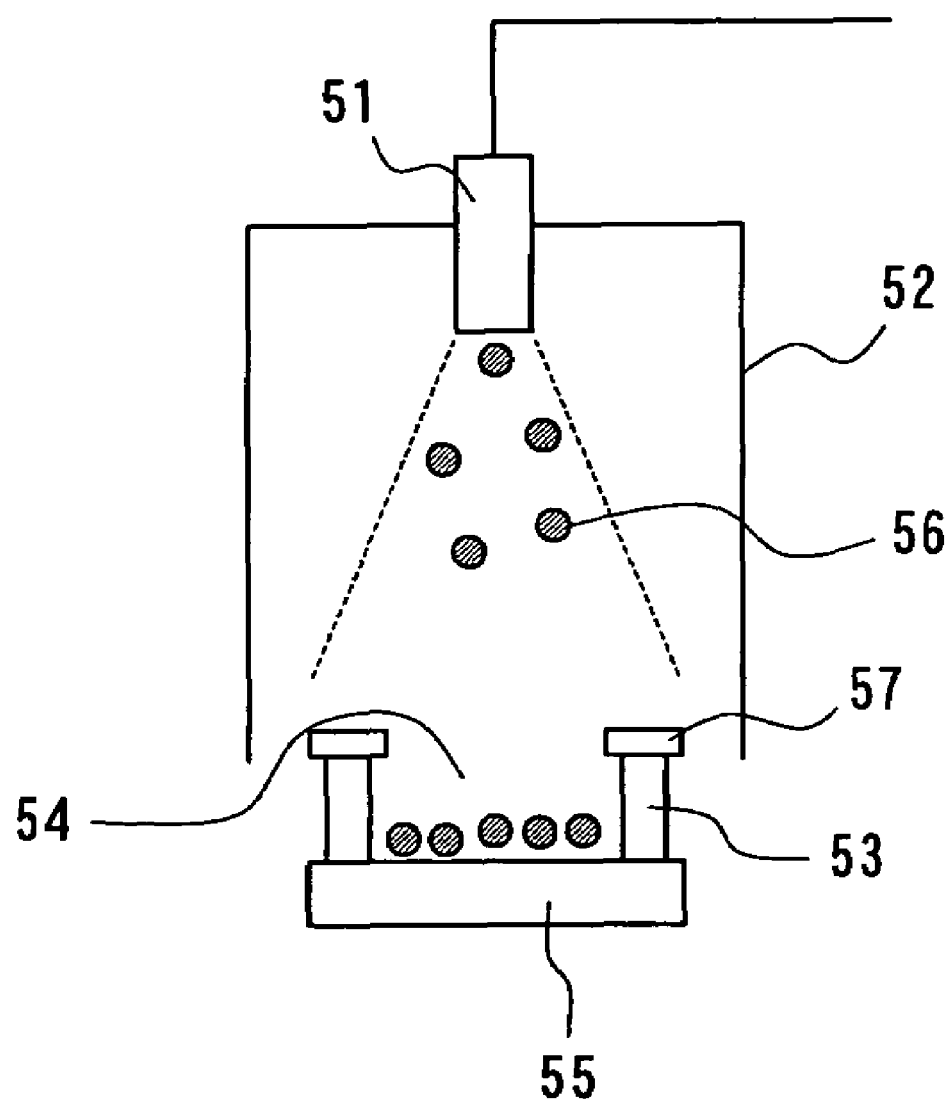
FIG. 24 is a schematic view explaining one known method of filling the display media.

In this case, the plate-like screens having the holes shown in FIG. 17 were used as the mask. At first, black color display media (particles K) were filled according to the known display media filling method shown in FIG. 24 by using the screen 21 (screen for K) shown in FIG. 17d. Then, R, G, B three groups of display media (particles A, particles B, particles C) were filled successively, according to the known display media filling method shown in FIG. 24, in such a manner that R, G, B three color display media were filled in the cells respectively along a row direction, by using successively the screens 21 (screen for R, screen for G, screen for B) shown in FIGS. 17*a* to 17*c*. Then, the opposed substrates were sandwiched to form the information display panel. The results are shown in the following Table 3.

TABLE 3

|  | Example 21 | Example 22 | Comparative example 21 |
|---|---|---|---|
| Result of estimation 1 | Observed by naked eyes that display media were filled uniformly in respective cells | Observed by naked eyes that display media were filled uniformly in respective cells | Observed by naked eyes that display media were filled uniformly in respective cells |
| Result of estimation 2 | There is no pixel in which predetermined display is not performed, and excellent display condition could be obtained | There is no pixel in which predetermined display is not performed, and excellent display condition could be obtained | There is a pixel in which predetermined display is not performed, and excellent display condition could not be obtained |
| Time required for forming panel (assumed known method as 1) | 1/10 | 1/20 | 1 |

The information display panel, which is manufactured according to the invention, is preferably applicable to the display unit for mobile equipment such as notebook personal computers, PDAs, cellular phones, handy terminals and so on; to the electric paper such as electric books, electric newspapers, electric manual (instruction) and so on; to the bulletin boards such as signboards, posters, blackboards and so on; to the image display unit for electric calculator, home electric application products, auto supplies and so on; to the card display unit such as point cards, IC cards and so on; and to the display unit for electric advertisements, electric POPs, electric price tags, electric shelf tags, electric musical score, RF-ID device and so on. In addition, it is preferably used for the display panel in which a display is rewritten by the outer electric filed applying means (so called rewritable paper).

What is claimed is:

1. A method of manufacturing an information display panel, in which at least one group of display media having optical reflectance and charge characteristics and consisting of at least one or more groups of particles, are sealed in a cell formed by partition walls between two substrates, at least one substrate being transparent, and, in which the display media, to which an electrostatic field is applied, are made to move so as to display information such as an image, comprising a display media filling step for filling the display media in the cell including the steps of: setting a screen over the partition walls; arranging the display media on the screen; and moving a plate member on the screen under such a condition that the plate member is contacted to the screen.

2. The method of manufacturing an information display panel according to claim 1, wherein a position of the cell formed by the partition walls and a position of arranging mesh open portions of the screen or a position of arranging holes of the screen correspond one by one.

3. The method of manufacturing an information display panel according to claim 1, wherein, in the case of filling plural groups of the display media having different optical reflectance and different charge characteristics in the cell, a mixture of plural groups of the display media having different optical reflectance and different charge characteristics is filled in the cell.

4. The method of manufacturing an information display panel according to claim 3, wherein, in the case of arranging electrodes to the substrate, a position of arranging the electrodes and a position of arranging mesh open portions of the screen or a position of arranging holes of the screen correspond one by one.

5. The method of manufacturing an information display panel according to claim 1, wherein an area, to which the display media are to be filled, is controlled by a mesh shape of the screen.

6. The method of manufacturing an information display panel according to claim 1, wherein an amount of the display media to be filled in the cell is controlled by a size and a kind of the screen and a moving condition of the plate member.

* * * * *